United States Patent
Sugahara

(10) Patent No.: US 8,172,375 B2
(45) Date of Patent: May 8, 2012

(54) VALVE AND ACTUATOR EMPLOYING CAPILLARY ELECTROWETTING PHENOMENON

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1164 days.

(21) Appl. No.: 11/721,962

(22) PCT Filed: Dec. 19, 2005

(86) PCT No.: PCT/JP2005/023300
§ 371 (c)(1),
(2), (4) Date: Jun. 15, 2007

(87) PCT Pub. No.: WO2006/064949
PCT Pub. Date: Jun. 22, 2006

(65) Prior Publication Data
US 2008/0094448 A1    Apr. 24, 2008

(30) Foreign Application Priority Data
Dec. 17, 2004 (JP) .................................. 2004-365896

(51) Int. Cl.
*B41J 2/17* (2006.01)
(52) U.S. Cl. .................. 347/84; 347/6; 347/21; 347/87; 200/193; 200/182
(58) Field of Classification Search .......... 347/6, 84–87, 347/21, 29; 200/193, 182
See application file for complete search history.

(56) References Cited

U.S. PATENT DOCUMENTS

| | | | | |
|---|---|---|---|---|
| 4,158,118 A | * | 6/1979 | Graf | 137/251.1 |
| 4,505,539 A | * | 3/1985 | Auracher et al. | 385/19 |
| 4,824,073 A | | 4/1989 | Zdeblick | |
| 5,224,684 A | | 7/1993 | Schouten | |
| 6,082,851 A | * | 7/2000 | Shihoh et al. | 347/85 |

(Continued)

FOREIGN PATENT DOCUMENTS

EP    03068670 A2    8/2003

(Continued)

OTHER PUBLICATIONS

European Patent Office; European Search Report in Application No. 05816950.9 (counterpart to the above-captioned U.S. patent application) mailed Nov. 3, 2009.

(Continued)

*Primary Examiner* — Matthew Luu
*Assistant Examiner* — Henok Legesse
(74) *Attorney, Agent, or Firm* — Baker Botts L.L.P.

(57) ABSTRACT

A valve includes: a passage having a first passage which communicates an atmosphere-communicating passage and outside of a cartridge body, and a second passage which branches from the first passage; an electrode provided on a wall surface forming the second passage; an electrode provided on a wall surface of a bottom wall lid forming the first passage; a driver IC which applies a predetermined voltage selectively to one of these two kinds of electrodes; an insulating film provided on a surface of the electrode; and an insulating film provided on a surface of the electrode. Accordingly, there is provided a valve which is capable of opening and closing a passage communicating two spaces separated from each other, which has no movable part, and which has a simple construction.

15 Claims, 23 Drawing Sheets

U.S. PATENT DOCUMENTS

| | | | |
|---|---|---|---|
| 6,212,308 B1* | 4/2001 | Donald | 385/16 |
| 6,397,880 B1* | 6/2002 | Stoll et al. | 137/271 |
| 6,435,665 B2* | 8/2002 | Lerat et al. | 347/54 |
| 6,449,081 B1 | 9/2002 | Onuki et al. | |
| 6,538,823 B2 | 3/2003 | Kroupenkine et al. | |
| 6,545,815 B2 | 4/2003 | Kroupenkine et al. | |
| 6,561,224 B1 | 5/2003 | Cho | |
| 6,575,188 B2* | 6/2003 | Parunak | 137/251.1 |
| 6,603,444 B1 | 8/2003 | Kawanami et al. | |
| 6,646,527 B1* | 11/2003 | Dove et al. | 335/47 |
| 6,777,630 B1* | 8/2004 | Dove et al. | 200/182 |
| 6,872,904 B2* | 3/2005 | Fong et al. | 200/182 |
| 7,694,694 B2* | 4/2010 | Welle | 137/828 |
| 7,980,272 B2* | 7/2011 | Park et al. | 137/828 |
| 2003/0089865 A1* | 5/2003 | Eldridge | 251/11 |
| 2003/0108804 A1 | 6/2003 | Cheng et al. | |
| 2004/0007275 A1 | 1/2004 | Hui Liu et al. | |
| 2004/0058450 A1* | 3/2004 | Pamula et al. | 436/150 |
| 2004/0135854 A1 | 7/2004 | Kuwabara et al. | |
| 2006/0165565 A1* | 7/2006 | Ermakov | 422/130 |

FOREIGN PATENT DOCUMENTS

| | | |
|---|---|---|
| JP | H03-084274 A | 4/1991 |
| JP | H08-026886 A | 1/1996 |
| JP | H11-105305 A | 4/1999 |
| JP | 2000-356750 A | 12/2000 |
| JP | 2000-356751 A | 12/2000 |
| JP | 2001-013306 A | 1/2001 |
| JP | 2002-013306 A | 1/2001 |
| JP | 2001-293900 A | 10/2001 |
| JP | 2002-514520 A | 5/2002 |
| JP | 2003-050303 A | 2/2003 |
| JP | 2003-177219 A | 6/2003 |
| JP | 2003-185829 A | 7/2003 |
| JP | 2004-188720 A | 7/2004 |
| JP | 2005-525514 A | 8/2005 |
| WO | 03068670 A2 | 8/2003 |

OTHER PUBLICATIONS

Japanese Patent Office, International Search Report for Int'l Pat. Appl'n. No. PCT/JP2005/023300, mailed Mar. 20, 2006.

Japan Patent Office, Decision to Grant a Patent for Japanese Patent Application No. 2006-520531 (counterpart to above-captioned patent application), mailed Jun. 14, 2011.

* cited by examiner

→ SCANNING DIRECTION
↙ PAPER FEEDING DIRECTION

Fig. 19
(a)
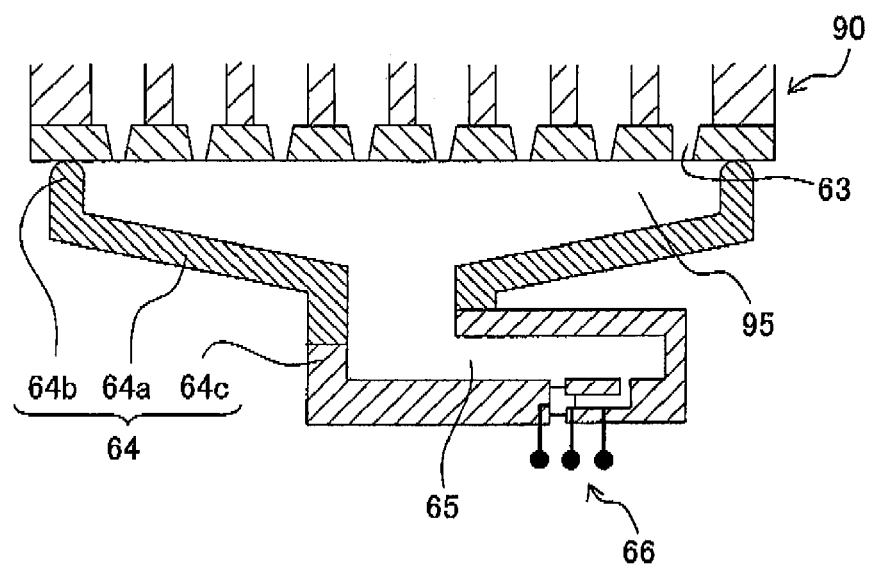
(b)
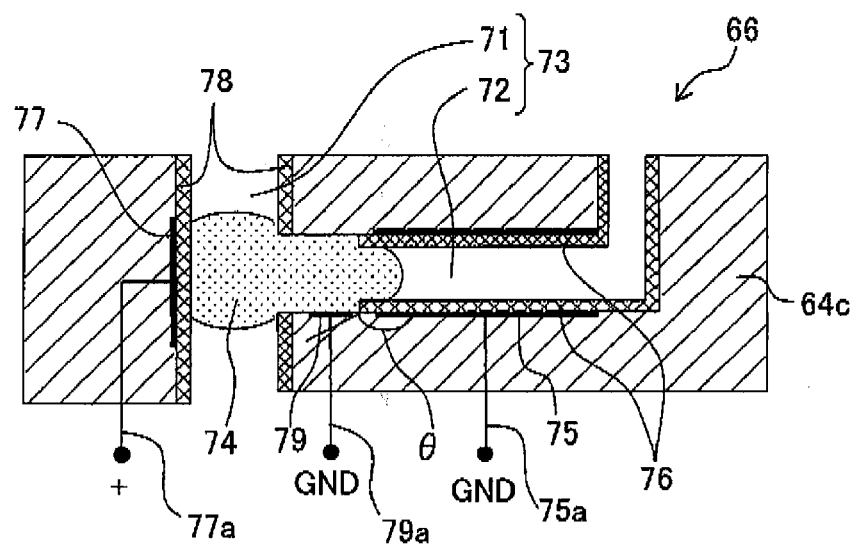

Fig. 20
(a)
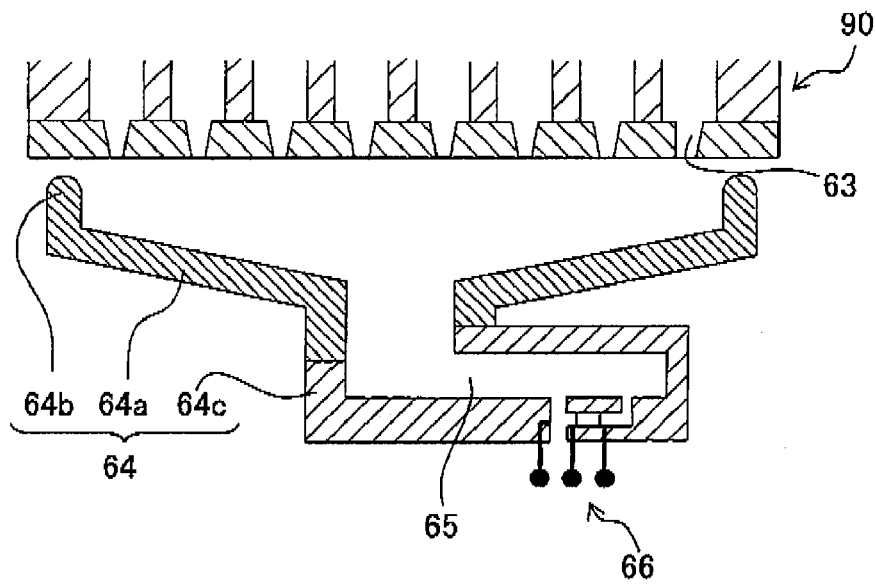
(b)
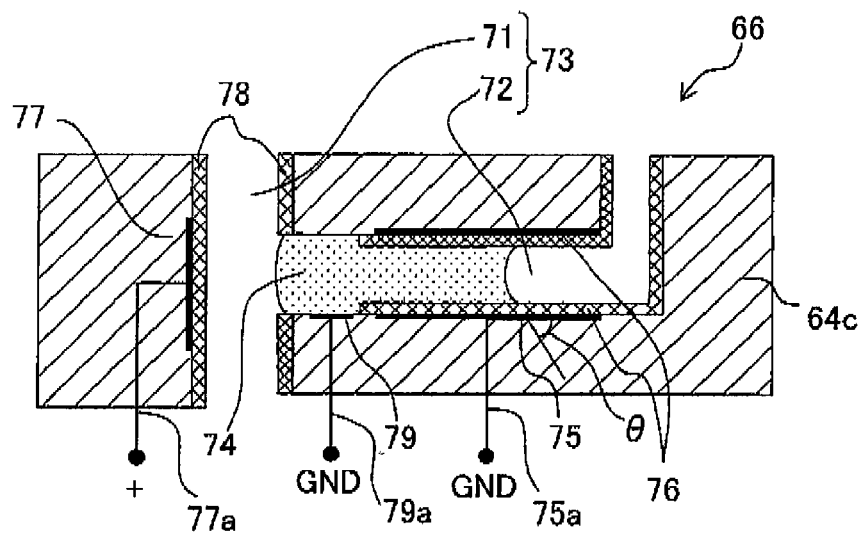

US 8,172,375 B2

VALVE AND ACTUATOR EMPLOYING CAPILLARY ELECTROWETTING PHENOMENON

CROSS-REFERENCE TO RELATED APPLICATIONS

This application is a national stage application under 35 U.S.C. §371 of International Patent Application No. PCT/JP2005/023300, filed Dec. 19, 2005, which claims the benefits of Japanese Patent Application No. 2004-365896 filed Dec. 17, 2004; each of which is incorporated herein by reference.

TECHNICAL FIELD

The present invention relates to a valve which can open and close a passage connecting two separate spaces. More specifically, the invention relates to a valve and an actuator which employs a capillary electrowetting phenomenon.

BACKGROUND ART

An ink-jet printer has an ink-jet head for discharging ink and an ink cartridge for supplying ink to the head. For smooth ink supply to the ink-jet head, the ink cartridge has an atmosphere-communicating passage through which atmospheric air flows into the ink cartridge. The amount of atmospheric air flowing into the ink cartridge is equivalent to the amount of ink flowing out through the supply port of the ink cartridge. However, the communication between the inside of the ink cartridge and the atmosphere by the atmosphere-communicating passage causes the ink in the cartridge to evaporate gradually and becomes viscous. This changes the volume of the ink droplets discharged through the nozzles of the ink-jet head and the speed at which the droplets are discharged, thereby lowering the printing quality. Therefore, for example, an ink cartridge (an ink tank) which has a narrow and labyrinthine atmosphere-communicating passage, which is capable of decelerating ink evaporation has been proposed (for example, see Patent Document 1).

Patent Document 1: Japanese Patent Application Laid-open No. 11-105305 (FIG. 1)

DISCLOSURE OF THE INVENTION

Problem to Be Solved by the Invention

In the ink cartridge described in Patent Document 1, since an atmosphere-communicating passage is formed in a labyrinthine structure, the evaporation of the ink is decelerated to some extent. However, the inside of the cartridge still communicates with the atmosphere all the time. Consequently, when one ink cartridge is used for a long period in a state that the ink cartridge is attached to the printer, the ink in the cartridge is dried.

It is possible to prevent, to some extent, the ink in the cartridge from drying by providing an ink cartridge of an ink-jet printer with a valve having a general structure, such as a solenoid valve, for opening and closing the atmosphere-communicating passage of the cartridge, and in which the valve is opened only when the ink-jet head of the printer discharges ink, and the valve is closed when no ink discharge is performed. A valve of the general type such as a solenoid valve, however, has a mechanism for driving the valve body which comes into contact with the valve seat, and many of such valves are relatively complex in structure. Therefore, the cost of manufacturing an ink cartridge with such a valve is considerably high.

An object of the present invention is to provide a valve which can open and close a passage connecting two spaces separated from each other, and which has no movable part and is simple in structure. Another object of the invention is to provide a novel actuator utilizing a capillary electrowetting phenomenon. Still another object of the invention is to provide a channel opening-closing mechanism having such an actuator.

Means for Solving the Problem and Effect of the Invention

According to a first aspect of the present invention, there is provided a valve, including: an internal passage in which a first liquid having an electrical conductivity is confined, and which includes a first passage communicating two spaces separated from each other and a second passage branching from the first passage; a first electrode provided on a wall surface forming the second passage; and a first insulating film provided on a surface of the first electrode, and having a surface with which the first liquid contacts, a wetting angle of the first liquid with respect to the surface of the first insulating film with a predetermined voltage applied to the first electrode being lowered than that without the predetermined voltage applied to the first electrode. The valve may further include a voltage applying unit which applies the predetermined voltage to the first electrode.

In this valve, by applying the predetermined voltage to the first electrode or stopping the voltage application to the first electrode, it is possible to change the wetting angle of the first liquid on the surface of the first insulating film, so as to cause the first liquid to move between the first and second passages, thereby opening or closing the first passage. This makes the valve simple without a movable part and also makes it possible to reduce the cost of manufacturing the valve. This further reduces the noises made and the energy consumed while the valve is operating.

The valve may be constructed such that, when the voltage applying unit applies the predetermined voltage to the first electrode, the first liquid moves from the first passage to the surface of the first insulating film in the second passage so as to open the first passage; and when application of the predetermined voltage to the first electrode is stopped, the first liquid moves from the surface of the first insulating film in the second passage to the first passage so as to close the first passage.

In the valve of the present invention, when the predetermined voltage is applied to the first electrode, the wetting angle of the first liquid with respect to the first insulating film may be less than 90°; and when the predetermined voltage is not applied to the first electrode, the wetting angle of the first liquid with respect to the first insulating film may be not less than 90°. Accordingly, when the predetermined voltage is applied to the first electrode, the wetting angle of the liquid with respect to the surface of the first electrode is less than 90°, so that the liquid can be moved reliably from the first passage to the second passage. On the other hand, in this case, when no voltage is applied to the first electrode, the wetting angle of the liquid with respect to the surface of the first electrode is not less than 90°, so that the liquid can be moved reliably from the second passage to the first passage.

In the valve of the present invention, the first electrode and the first insulating film may be formed on the wall surface forming the second passage at a position away from a branching position where the second passage branches from the first passage; and a wetting angle of the first liquid with respect to a portion of the wall surface forming the second passage in the vicinity of the branching position may be lower than the wetting angle of the first liquid with respect to the first insulating film without the predetermined voltage applied to the first electrode. In this case, without the predetermined voltage being applied to the first electrode, the first liquid partially enters the second passage in the vicinity of the branching position. Accordingly, when the predetermined voltage is applied to the first electrode, the first liquid easily moves from the first passage to the second passage, thereby opening the first passage reliably. On the contrary, when the voltage application to the first electrode is stopped, the first liquid easily moves from the second passage to the first passage. This makes the switching operation of the valve highly reliable and responsive.

The valve of the present invention may further include: a second electrode provided on a wall surface forming the first passage; and a second insulating film provided on a surface of the second electrode; wherein the voltage applying unit may apply a voltage to the second electrode only when the predetermined voltage is not applied to the first electrode. When the voltage is applied to the second electrode, the wetting angle of the liquid with respect to the second insulating film on the second electrode is small. Accordingly, the liquid flows easily from the second passage to the first passage, thereby making it possible to close the first passage more reliably. On the other hand, when the voltage application to the second electrode is stopped, the wetting angle of the liquid on the second insulating film in the first passage is great. Accordingly, the liquid flows easily from the first passage to the second passage, thereby making it possible to open the first passage more reliably. This also makes the opening/closing operation of the valve highly responsive.

The valve may further may be provided with a third electrode provided on a wall surface forming the internal passage such that the third electrode is always kept in contact with the first liquid and is maintained at a constant electric potential. Accordingly, when the predetermined voltage is applied to the first electrode, a potential difference is made reliably between the liquid contacting with the third electrode and the first electrode, thereby reliably lowering the wetting angle of the liquid on the surface of the first electrode, and thus reliably moving the liquid from the first passage to the second passage. Further, when the predetermined voltage is applied to the second electrode, a potential difference is made reliably between the second electrode and the first liquid, thereby reliably lowering the wetting angle of the liquid on the surface of the second electrode, and thus reliably moving the first liquid from the second passage to the first passage.

In this case, the third electrode may be formed on the wall surface forming the second passage at a position in the vicinity of a branching position at which the second passage branches from the first passage. This makes it possible to keep the first liquid in contact with the third electrode at all time, more reliably maintaining the liquid having at the predetermined, constant electric potential.

In the valve of the present invention, the first passage may be greater in passage area than the second passage. In this case, capillary force developed in the second passage is greater than capillary force developed in the first passage. As a result, the first liquid moves easily from the first passage to the second passage, thereby making it possible to open the first passage more reliably. This also makes the opening/closing operation highly responsive.

In the valve of the present invention, a portion, of a surface of the first liquid, which has no contact with a wall surface of the internal passage may be covered with a second liquid which is non-volatile. Accordingly, by covering this portion of the first liquid by the non-volatile second liquid, the first liquid can be prevented from evaporating.

The valve of the present invention may further include a liquid supply source which is connected to the internal passage to supply the first liquid to the internal passage. Accordingly, even when the first liquid in the internal passage evaporates and decreases in amount, the liquid supply source can supply the first liquid to the internal passage.

The valve of the present invention may be provided on an ink cartridge including an ink storage space formed therein and an atmosphere-communicating passage communicating the ink storage space and atmosphere; wherein the valve may be constructed to be capable of opening and closing the atmosphere-communicating passage. When an amount of the ink in the storage space is decreased, by opening the atmosphere-communicating passage by the valve to introduce air into the ink storage space from outside according to the ink decrease, it is possible to supply ink smoothly to an ink-jet head. On the other hand, when no ink is supplied to the ink-jet head, the valve closes the atmosphere-communicating passage so as to prevent the ink in the cartridge from drying and being viscous. According to the present invention, an ink cartridge having such a valve is also provided.

The valve of the present invention may be provided in a cap which is attachable to an ink discharge surface of an ink-jet head for discharging ink onto a recording medium, and which has a communicating passage communicating a space on a side of the ink discharge surface and an outside of the ink discharge surface; wherein the valve may be capable of opening and closing the communicating passage. Accordingly, by pressing the cap against the ink discharge surface of the ink-jet head after the valve opens the communicating passage, the pressure change in the cap causes no pressure change in the nozzles of the head. This prevents the menisci of the nozzles from breaking. Further by closing the communicating passage by the valve after the cap has been pressed against the ink discharge surface, the ink in the nozzles is prevented from drying. According to the present invention, a cap for an ink-jet head which has such a valve is also provided.

In the valve which opens and closes the atmosphere-communicating passage of the ink cartridge or the communicating passage of the nozzle cap, the voltage applying unit may periodically apply the predetermined voltage for a predetermined period of time to the first electrode. In this case, by opening and closing the passage by the valve every time a predetermined period of time passes, the air existing in the cartridge or between the cap and the ink discharge surface is prevented from expanding or contracting due to temperature and pressure changes of the outside air.

The valve of the present invention may further includes a third passage which branches from the first passage; a second electrode formed on a wall surface forming the first passage; and a third electrode formed on a wall surface forming the third passage; wherein the first passage may communicate a first space and a fourth space, the third passage may communicate the first space and a third space, and the second passage may communicate the first space and a second space. This makes the valve function as a multi-way valve. In this case, by applying a predetermined voltage to the third electrode without applying a voltage to the first electrode, it is possible to communicate the first and second spaces; and by applying the predetermined voltage to the first electrode without applying a voltage to the third electrode, it is possible to communicate the first and third spaces.

According to the present invention, there is provided an actuator including: a passage having an open end which is open to a predetermined space; a plurality of electrodes provided in the passage; an insulating layer formed on the electrodes; a plunger movable in the passage; wherein an electrically conductive liquid is charged in the passage so as to contact with the plunger and the insulating layer; and a predetermined voltage is applied selectively to a predetermined electrode of the electrodes so as to move the plunger in the passage to be protrudable from the open end.

The actuator of the present invention is a novel actuator utilizing a capillary electrowetting phenomenon. The application of the predetermined voltage to a predetermined electrode of the electrodes lowers the wetting angle of the conductive liquid on an area, of the insulating film, at which the predetermined electrode is formed, and thus the conductive liquid is moved to this area of the insulating film, thereby enabling the plunger, which is in contact with the liquid, to move in the passage.

One end of the plunger, which is on a side opposite to the other end of the plunger facing the predetermined space, may be in contact with the liquid in the passage. Alternatively, the plunger may be accommodated in the passage and surrounded by the liquid. The actuator of the present invention may further include a spindle; wherein the electrodes and the insulating layer may be provided on the spindle; the plunger may have a hollow space in which the spindle is accommodated; and the plunger may be movable on the spindle via the liquid.

Lyophilic treatment or liquid-repellent treatment may be performed only for a portion of the plunger. This enables only a specified portion of the plunger to be supported by the liquid. The actuator of the present invention may further include a voltage applying unit which applies a voltage selectively to the electrodes.

According to a third aspect of the present invention, there is provided a channel opening-closing mechanism, including: the actuator of the present invention; and a wall arranged at a predetermined spacing distance from the open end of the passage; wherein a channel is defined between the wall and the open end, and the plunger is protruded from the open end into contact with the wall so as to close the channel. The channel opening-closing mechanism of the present invention can effectively control fluid flow by the actuator. The plunger of the actuator may have an engaging part formed at a tip of the plunger; and an engaged part engageable with the engaging part may be formed on the wall.

BRIEF DESCRIPTION OF THE DRAWINGS

FIG. 19($a$) is a sectional view of an ink-jet head in a state that a nozzle cap is attached to the ink-jet head, and FIG. 19($b$) is an enlarged sectional view of the valve as shown in FIG. 19($a$).

FIG. 20($a$) is a sectional view of an ink-jet head showing a state in which a nozzle cap is positioned just before the nozzle cap is attached to the ink-jet head, and FIG. 20($b$) is an enlarged sectional view of the valve as shown in FIG. 20($a$).

FIG. 32(b) shows a capillary phenomenon in which the wetting angle is greater than 90°.

Figure 1:
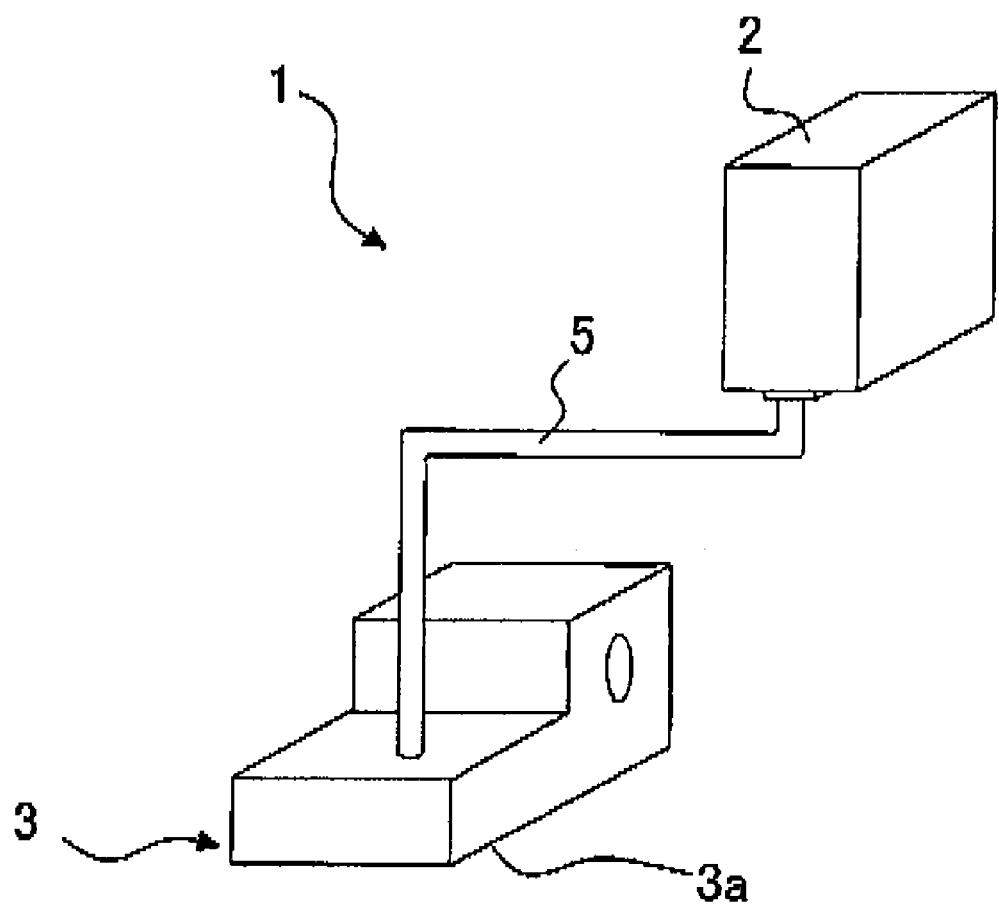
FIG. 1 is a schematic diagram of an ink-jet printer according to a first embodiment of the present invention.

LEGENDS OF REFERENCE NUMERALS 2 ink cartridge; 3 ink-jet head; 22 ink storage space; 24 atmosphere-communicating passage; 25, 25A, 25B, 25C, 25D: valve; 31 first passage; 32 second passage; 33 passage (internal passage); 34 liquid; 35 electrode (first electrode); 36 insulating film; 37, 37A: electrode (second electrode); 38 insulating film; 39 electrode (third electrode); 44 driver IC; 45 liquid; 46 liquid storage chamber; 57 driver IC; 60 ink-jet head; 60a ink discharge surface; 63 nozzle; 64 nozzle cap; 65 communicating passage; 66 valve; 71 first passage 72, second passage; 73 passage (internal passage); 74 liquid; 75 electrode (first electrode); 76 insulating film; 77 electrode (second electrode); 78 insulating film; 79 electrode (third electrode); 121 channel structure; 201, 301, 401: channel opening-closing mechanism; 205, 305, 405: plunger

BEST MODE FOR CARRYING OUT THE INVENTION

First, an explanation will be given about a capillary electrowetting phenomenon (hereinafter referred to as "CEW phenomenon" as appropriate) which the inventors of this patent application have found out and which can be used to transfer and move liquid in a valve and an actuator according to the present invention.

Figure 32:
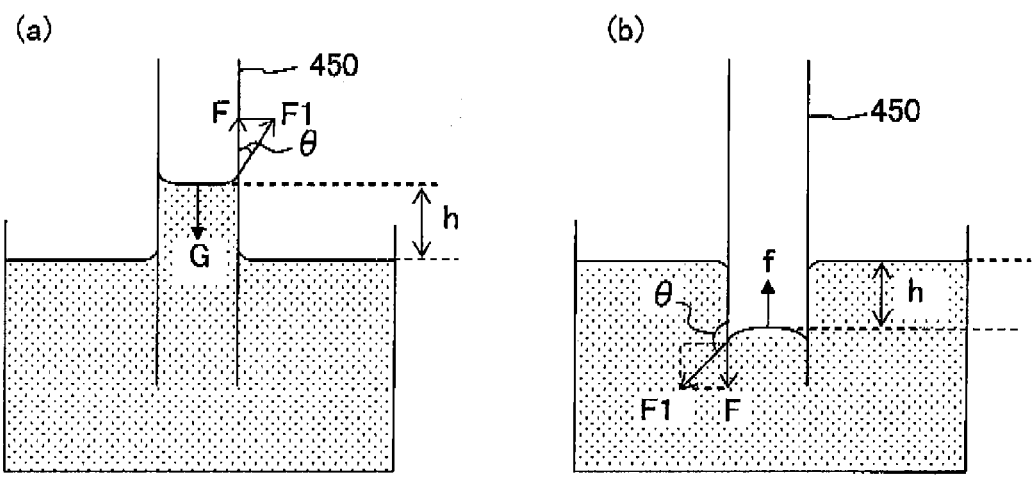
FIG. 32 is a drawing explaining capillary phenomenon, in which FIG. 32($a$) shows a capillary phenomenon in which the wetting angle is less than 90°.

As shown in FIGS. 32(a) and 32(b), if a thin tube (capillary) is put into a liquid and positioned upright, the liquid level inside the tube rises above or lowers below the liquid level outside the tube (capillary phenomenon). Depending on a magnitude relationship between the cohesive force among the liquid molecules and the adhesive force between the liquid and the tube wall, the liquid level inside the tube rises when the liquid wets the tube (when the wetting angle is less than 90°), and the liquid level inside the tube lowers when the liquid does not wet the tube (when the wetting angle is greater than 90°).

In a case that a wetting angle θ between a tube 450 and the liquid surface is less than 90°, a height difference h between the liquid levels inside and outside the tube 450 depends on the balance between a resultant force F of a surface tension F1 on the liquid surface inside the tube and a gravity G on a portion of the liquid inside the tube which is positioned above the liquid level outside the tube (see FIG. 32(a)). In a case that the wetting angle θ is greater than 90°, the height difference h between the liquid levels inside and outside the tube 450 depends on the balance between the resultant force F of the surface tension F1 on the liquid surface inside the tube and a buoyancy f acting on the liquid in the tube due to the lowering of the liquid level inside the tube (see FIG. 32(b). For example, in a case that the tube is formed of glass and the liquid is water, the liquid level inside the tube rises about 1 cm when the tube has an inner diameter of 3 mm, while the liquid level inside the tube rises about 28 cm when the tube has an inner diameter of 0.1 mm.

Thus, it depends on the material for the tube and the composition of the liquid whether the liquid level inside the tube rises above or lowers below the liquid level outside the tube due to capillary phenomenon. Further, it is known that the height difference h between the liquid levels inside and outside the tube depends on the inner diameter of the tube and the density of the liquid in addition to the material for the tube and the composition of the liquid. Accordingly, it has conventionally been impossible to freely control the rising and lowering of the liquid level inside a tube due to capillary phenomenon, and in addition, in order to set the liquid level inside a tube, it has been necessary to change the inner diameter of the tube according to the set level.

Figure 33:
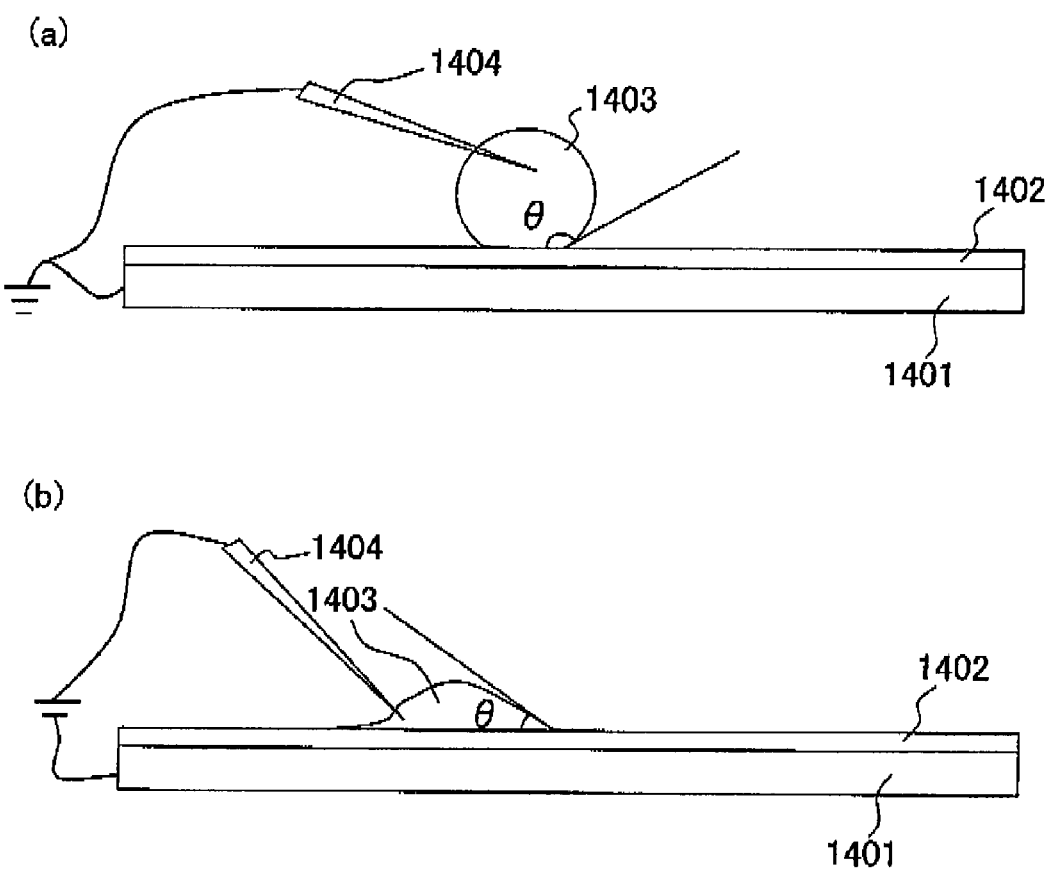
FIG. 33(a) is a schematic sectional view showing a droplet placed on a repellent insulating film.
FIG. 33(b) is a schematic sectional view showing the electrowetting phenomenon occurring when voltage is applied between a droplet and an electrode.

Therefore, the inventors of the present application have done a lot of consideration and performed experiments to establish a technique for freely controlling the liquid level inside a capillary tube and the rising and lowering of the liquid level. As a result of the consideration and experiments, the inventors have found out a new phenomenon, which can be called a capillary electrowetting phenomenon, by combining the electrowetting phenomenon and capillary phenomenon. Here, according to the electrowetting phenomenon, for example, as shown in FIGS. 33(a) and 33(b), a droplet 1403 of an electrically conductive liquid is placed on a water-repellent thin film 1402 provided on a plate electrode 1401, and an electrode 1404 in the form of a fine wire is inserted into the droplet 1403. In this case, after a voltage is applied between the droplet 1403 and the plate electrode 1401, wettability of the thin film 1402 is higher and wetting angle θ is smaller (see FIG. 33(b)), as compared with a state before applying the voltage between the droplet 1403 and the plate electrode 1401 (see FIG. 33(a)).

The inventors of the present application have particularly focused attention that, in the electrowetting phenomenon, a wetting angle of greater than 90° can be reduced to less than 90°, and found out that it is possible to control the movement of the liquid level inside a capillary tube freely and instantly (the CEW phenomenon) by controlling the wettability of a wall surface of the tube by using the electrowetting phenomenon. Namely, by providing an electrode on the wall surface of the capillary tube, coating the electrode and the wall surface with a thin film having a predetermined water-repellent property, and applying a voltage between the conductive liquid and the electrode, it is possible to control the movement of the liquid level according to an amplitude of the voltage and an area at which the voltage is applied. Based on the CEW phenomenon, the inventors have completed a valve and an actuator which can be used for various purposes, and a channel opening-closing mechanism provided with such an actuator. For the utilization of the CEW phenomenon, it is preferable that the inner diameter (width) of a capillary tube (passage) be not more than 4 mm.

First Embodiment

A first embodiment of the present invention will be explained. This embodiment is an example in which the present invention is applied to an ink cartridge which stores an ink to be supplied to an ink-jet head.

First, an ink-jet printer provided with an ink-jet head will be explained briefly. FIG. 1 is a schematic diagram of an ink-jet printer 1 according to this embodiment. As shown in FIG. 1, the ink-jet printer 1 has an ink-jet head 3 which discharges ink onto recording paper, an ink cartridge 2 connected to the ink-jet head 3 via a tube 5, and a control unit 40 (see FIG. 6) which controls various operations of the ink-jet printer 1 including an ink discharging operation of the ink-jet head 3 and the like. The ink-jet printer 1 performs recording an image on a recording paper by discharging an ink through a plurality of nozzles (not shown) formed on an ink-discharge surface 3a of the ink-jet head 3, while supplying the ink from the ink cartridge 2 through the tube 5 to the ink-jet head 3.

Figure 2:
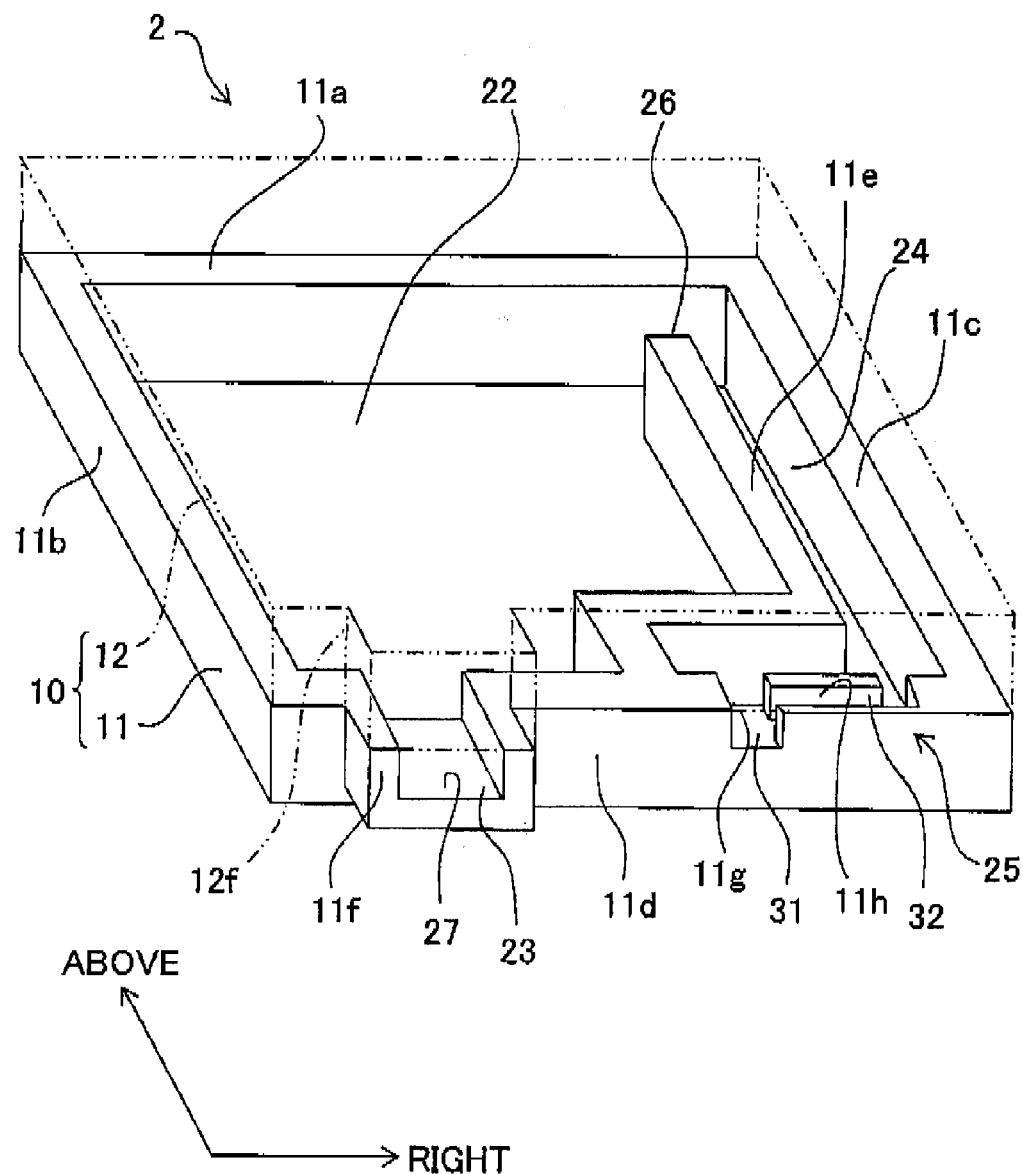
FIG. 2 is a perspective view of an ink cartridge.
Figure 3:
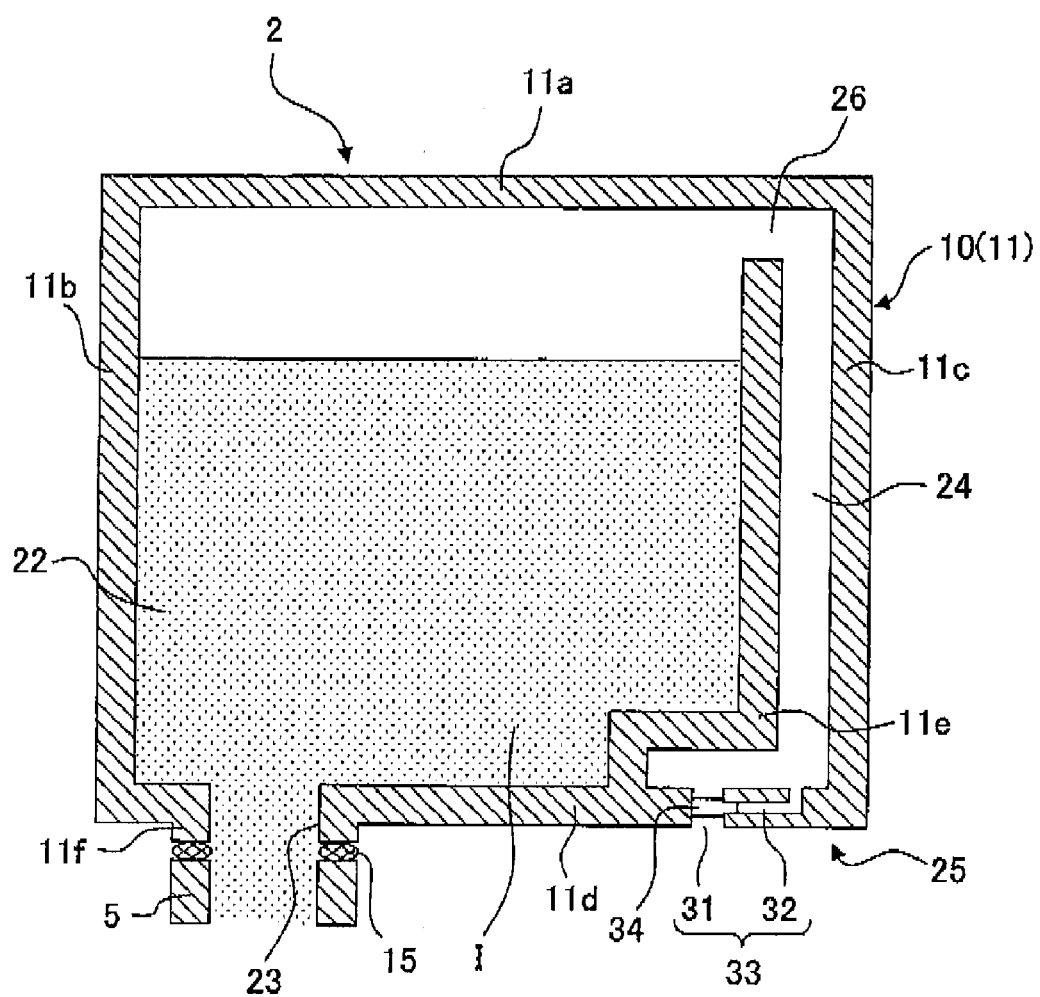
FIG. 3 is a sectional view of the ink cartridge.

Next, the ink cartridge 2 will be explained by using FIGS. 2 and 3. FIG. 2 is a perspective view of the ink cartridge 2 shown in FIG. 1, and FIG. 3 is a sectional view of the ink cartridge 2. In the following explanation, the far side in FIG. 2 is defined as upper portion, and the left and right directions in FIG. 2 is defined as the left and right direction. As shown in FIG. 2, the ink cartridge 2 has a cartridge body 10 having an ink storage space 22 and an atmosphere-communicating passage 24 both formed in the ink cartridge body 10, the atmosphere-communicating passage 24 communicating the ink storage space 22 with the atmosphere; and a valve 25 which can open and close the atmosphere-communicating passage 24.

First, the cartridge body 10 will be explained. The cartridge body 10 has two plate members (a first plate member 11 and a second plate member 12) in the form of flat plates, which are formed of synthetic resin (for example, polypropylene) which is high in the wettability with respect to ink. The two plate members 11 and 12 are formed to be identical in plan view, and joined together in a face-to-face fashion by an adhesion or the like.

As shown in FIGS. 2 and 3, the first plate member 11 has an upper wall 11a, left and right side walls 11b and 11c, and a bottom wall 11d all formed at the periphery of the first plate member 11 so as to surround the central portion of the first plate member 11. The first plate member 11 also has a partition wall 11e which extends first upwardly from the bottom wall 11d, then extends rightwardly, and further extends upwardly. A space surrounded (defined) by the upper wall 11a, the left and right side walls 11b and 11c and the bottom walls 11d of the first plate member 11 and the second plate member 12 is divided by the partition wall 11e into right and left sides, thereby forming the ink storage space 22 and the atmosphere-communicating passage 24 on the left and right sides, respectively, of the partition wall 11e. A communicating passage 26, communicating an upper portion of the storage space 22 and an upper portion of the atmosphere-communicating passage 24 with each other, is formed between the partition wall 11e and the upper wall 11a. At a right side portion of the bottom plate 11d, a first passage 31, of the valve 25 which will be described later on (see FIGS. 4 and 5), the first passage 31 communicating with the atmosphere-communicating passage 24, is formed through the bottom wall 11d. Further, a second passage 32, of the valve 25, which branches off from the first passage 31 is also formed on the bottom wall 11d.

The bottom wall 11d of the first plate member 11 has a protruding portion 11f which is formed at a left portion of the first plate member 11 and which protrudes downwardly from the left portion of the first plate member 11. Likewise, the second plate member 12 has a protruding portion 12f which is formed at a portion facing the protruding portion 11f and which protrudes downwardly from this portion of the second plate member 12. The protruding portions 11f and 12f have shapes identical in plan view and are joined together. The tube 5 is connected to the protruding portions 11f and 12f with an annular sealer 15. A supply passage 23, which communicates the ink storage space 22 and the tube 5, is formed in the protruding portions 11f and 12f.

It is constructed such that, when an ink I in the storage space 22 is supplied from the supply passage 23 and via the tube 5 to the ink-jet head 3, atmospheric air is concurrently taken in through the atmosphere-communicating passage 24 into the storage space 22 in an amount equivalent to an amount of the ink I which has flowed out of the storage space 22.

Figure 4:
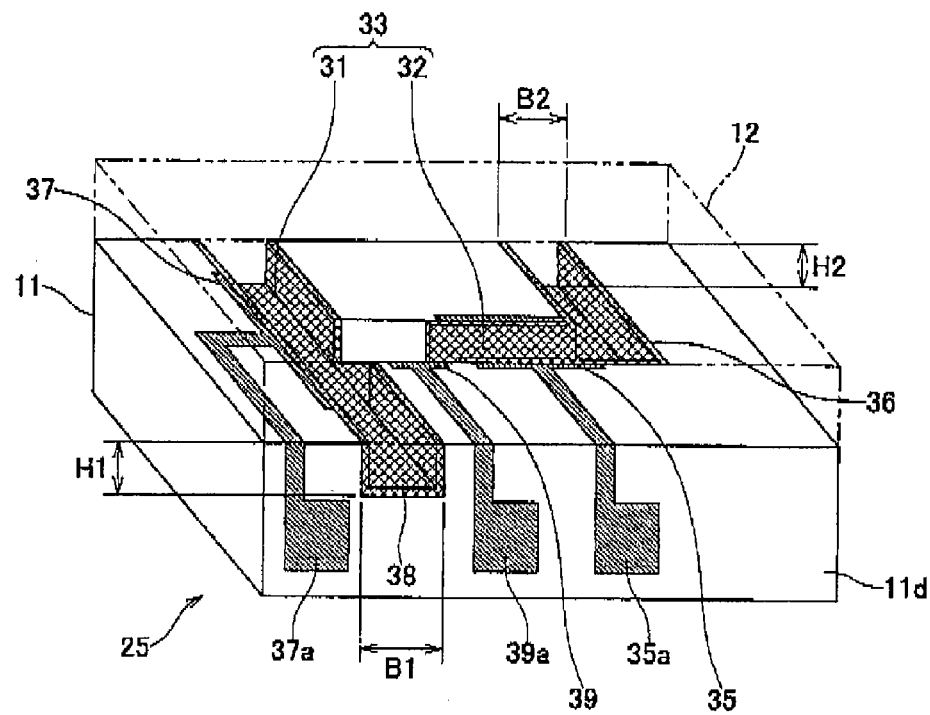
FIG. 4 is an enlarged view of those in the vicinity of the valve shown in FIG. 2.
Figure 5:
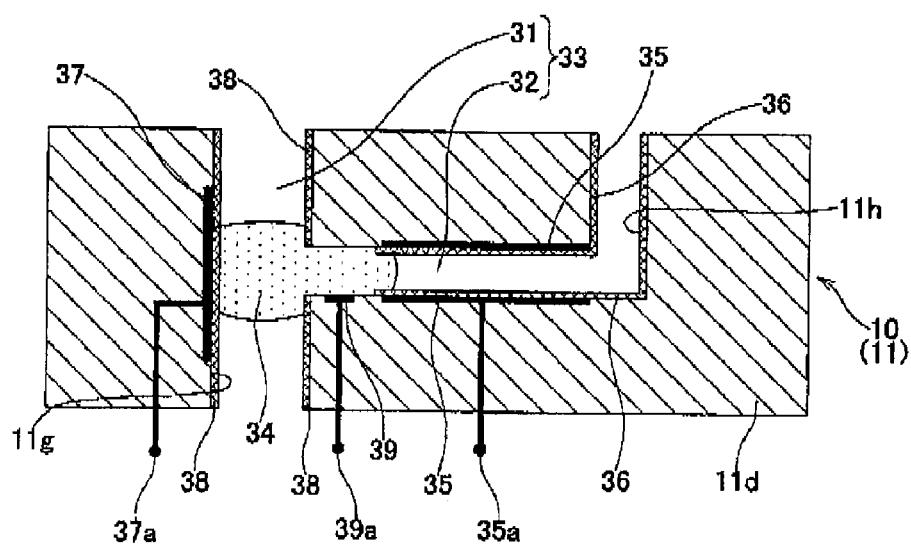
FIG. 5 is an enlarged sectional view of a valve.

Next, the valve 25 will be explained with reference to FIGS. 4 and 5. FIG. 4 is a perspective view of the valve 25, and FIG. 5 is an enlarged sectional view of the valve 25. When the ink is supplied from the ink cartridge 2 to the ink-jet head 3, the valve 25 opens the atmosphere-communicating passage 24. On the other hand, when ink is not supplied from the ink cartridge 2 to the ink-jet head 3, the valve 25 closes the atmosphere-communicating passage 24 so as to prevent the ink I in the storage space 22 from drying.

As shown in FIGS. 4 and 5, the valve 25 has a passage 33 (internal passage) having the first passage 31 communicating the atmosphere-communicating passage 24 and the outside of the cartridge body 10 and the second passage 32 branching off from the first passage 31; an electrode 35 (first electrode) provided on a wall surface of the second passage 32; an electrode 37 (second electrode) provided on a wall surface of the first passage 31; a driver IC 44 (voltage applying unit: see FIG. 6) which selectively applies a predetermined voltage either one of these two kinds of electrodes 35, 37; an insulating film 36 provided on a surface of the electrode 35; and insulating film 38 formed on a surface of the electrode 37.

The first passage 31 is formed to penetrate the bottom wall 11d in up and down direction by a groove 11g formed on the bottom wall 11d of the first plate member 11. On the other hand, the second passage 32 is defined by a groove 11h branching off rightwardly from a central portion in the up and down direction of the groove 11g and further extending upwardly. The second passage 32 communicates with both the first passage 31 and the atmosphere-communicating passage 24. These two passages 31 and 32 are rectangular in cross section. In the valve 25 of this embodiment, the first passage 31 is greater in sectional area than the second passage 32. For example, with reference to FIG. 4, the first passage 31 has a width B1 of 200 μm and a height H1 of 120 μm; and the second passage 32 has a width B2 of 120 μm and a height H2 of 120 μm. More generally, it is preferable that the width of the second passage 32 be not more than 4 mm so that the capillary electrowetting phenomenon can be elicited in the second passage 32.

An electrically conductive liquid 34 (first liquid) is enclosed in the passage 33 constructed of these first and second passages 31 and 32. The conductive liquid 34 opens and closes the first passage 31 by moving between the first and second passages 31 and 32. As the conductive liquid 34, for example, it is possible to use water, an aqueous solution with glycerin or the like dissolved in water, and the like. Alternatively, it is possible to use an ionic liquid (a room-temperature fused salt) composed only of ions. Because the ionic liquid is generally nonvolatile, it has an advantage of not evaporating even if it is exposed to the atmosphere.

A pair of the electrodes 35 is formed at a position of the portion, of the wall surface of the groove 11h forming a part of the second passage branching from the first passage 31 and extending in the rightward direction, the position being spaced (away) by a predetermined distance from the branching position. The electrodes 35 are connected to the driver IC 44 (see FIG. 6) via a connector 35a. The electrode 37 is formed on the left wall (left wall surface) of the groove 11g forming the first passage 31, at a position facing the branching position at which the second passage 32 branches off from the first passage 31. The electrode 37 is connected to the driver IC 44 by a connector 37a. The predetermined voltage is applied from the driver IC 40 selectively to either one of the electrodes 35 and 37. The other one of the electrodes 35 and 37, to which no voltage is applied, is kept at ground potential through the associated connector 35a or 37a. Further, an electrode 39 (third electrode) is formed on the wall surface, of the groove 11h forming the second passage 32, in the vicinity of the branching position at which the second passage 32 branches off from the first passage 31 (a position between the branching position and the position at which the electrode 35 is formed). The electrode 39 is kept at ground potential via a connector 39a at all time. The three kinds of electrodes 35, 37 and 39 can be formed by a known method such as a vapor deposition method, a sputtering method, printing or the like.

The insulating film 36, made of fluororesin (fluorocarbon resin) such as tetrafluoroethylene, is formed entirely on the wall surface of the groove 11h, of the second passage 32, including the surfaces of the electrodes 35 but except for the vicinity of the branching position. When no voltage is applied to the electrodes 35, the liquid repellency of the surface of the insulating film 36 is higher than the liquid repellency of the portion of the wall surface of the second passage 32 in which the insulating film 36 is not formed. In other words, the wetting angle of the liquid 34 with respect to the vicinity of the branching portion having no insulating film 36 formed thereon is smaller than the wetting angle of the liquid 34 on the surfaces of the insulating film 36. However, when the driver IC 44 applies voltage to the electrodes 35, the liquid repellency of the portion (corresponding to the first insulating film of the present application) of the insulating film 36 on the surface of each of the electrodes 35 is partially lowered, reducing the wetting angle of the liquid 34 on the surface of the insulating film 36 (electrowetting phenomenon). The highly liquid-repellent insulating film 36 is formed on the wall surface forming the second passage 32, up to a portion inward of the electrodes 35. This keeps the liquid 34 from moving inward from the electrodes 35 even if an air pressure difference or the like arises between the inside and outside of the cartridge body 10.

The insulating film 38 is formed entirely on the wall surface of the groove 11g, of the first passage 31, including the surface of the electrode 37. The insulating film 38 is formed of the same material (for example, fluororesin) as the insulating film 36 is formed of. The liquid repellency of the surface of the insulating film 38 is higher than the liquid repellency of a portion of the wall surface, of the first passage 31, in which the insulating film 38 is not formed. However, when the driver IC 44 applies voltage to the electrode 37, an electrowetting phenomenon occurs as is the case with the insulating film 36. Due to this phenomenon, the liquid repellency of the portion (corresponding to the second insulating film of the present application) of the insulating film 38 formed on the surface of the electrode 37 is lowered, thereby reducing the wetting angle of the liquid 34 on the surface of this portion. The highly liquid-repellent insulating film 38 is formed on the wall surface forming the first passage 31 also at portions above and below the portion at which the electrode 37 is formed. Consequently, an air pressure difference between the inside and outside of the cartridge body 10 or gravity does not cause the liquid 34 to be sucked into the atmosphere-communicating passage 24 or drop out of the first passage 31. The insulating films 36 and 38 can be formed on the wall surfaces of the grooves 11g and 11h forming the first and second passages 31 and 32, respectively, by a method such as spin coating, sputtering, or the like.

The selective application of the predetermined voltage from the driver IC 44 to the electrodes 35 or the electrode 37 changes the wetting angle of the liquid 34 with respect to the surface of the associated insulating film 36 or 38 so as to move the liquid 34 between the first passage 31 and the second passage 32, thereby making it possible for the valve 25 to open or close the first passage 31. The switching operation (opening/closing operation) for opening and closing the first passage 31 will be explained later in detail.

The insulating film 36 is not formed on the surface of the electrode 39 formed in the vicinity of the branching position and is kept always at ground potential. Accordingly, the liquid 34 is always in contact with the electrode 39 and is kept at ground potential. Accordingly, when the predetermined voltage is applied to the electrodes 35 or the electrode 37, a potential difference arises between the liquid 34 and the electrodes 35 or the electrode 37, thereby making it possible to reliably lower the wetting angle of the liquid 34 on the portion or portions of the associated insulating film 38 or 36 formed on the electrode 37 or electrodes 35.

Figure 6:
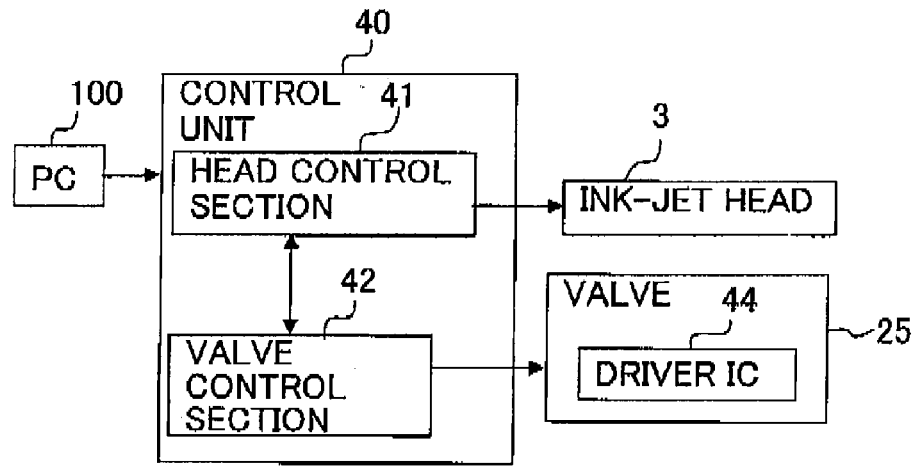
FIG. 6 is a block diagram showing the electrical configuration of the ink-jet printer.

Next, the electrical configuration of the ink-jet printer 1 according to this embodiment will be explained with reference to the block diagram of FIG. 6. The control unit 40 has a CPU which is a central processing unit; a ROM (read only memory) storing programs and data and the like for controlling the overall operation of the ink-jet printer 1; a RAM (random access memory) temporarily storing data processed by the CPU; and the like. As shown in FIG. 6, the control unit 40 includes a head control section 41 which controls the ink discharging operation of the ink-jet head 3, and a valve control unit 42 which controls the switching operation of the valve 25 for opening and closing the atmosphere-communicating passage 24 of the ink cartridge 2.

In accordance with printing data inputted from a PC 100 to the control unit 40, the head control section 41 controls the ink-jet head 3, causing the head to discharge ink onto recording paper to perform predetermined printing on the paper. When a print command is inputted from the PC 100, the valve control section 42 so controls the driver IC 44 of the valve 25 that the atmosphere-communicating passage 24 is opened before the ink discharging operation is performed by the ink-jet head 3, and that the atmosphere-communicating passage 24 is closed at the end of the ink discharging operation by the ink-jet head 3. Each of the head control section 41 and the valve control section 42 is constructed of a CPU, a ROM, a RAM and the like.

Figure 7:
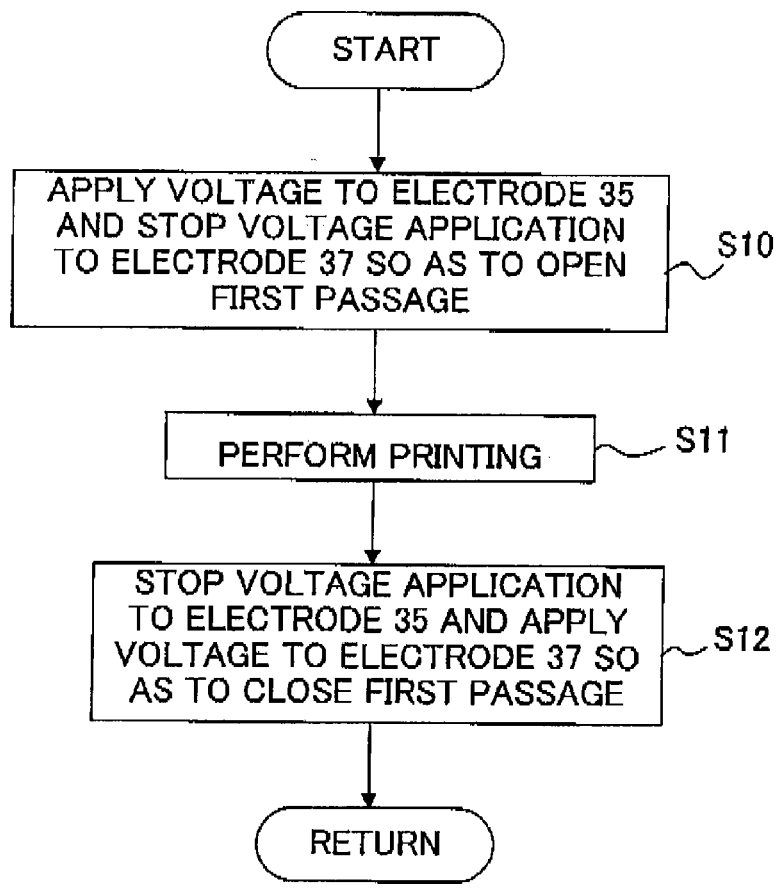
FIG. 7 is a flowchart of the series of operation steps performed by the ink-jet printer when the printer carries out printing.
Figure 8:
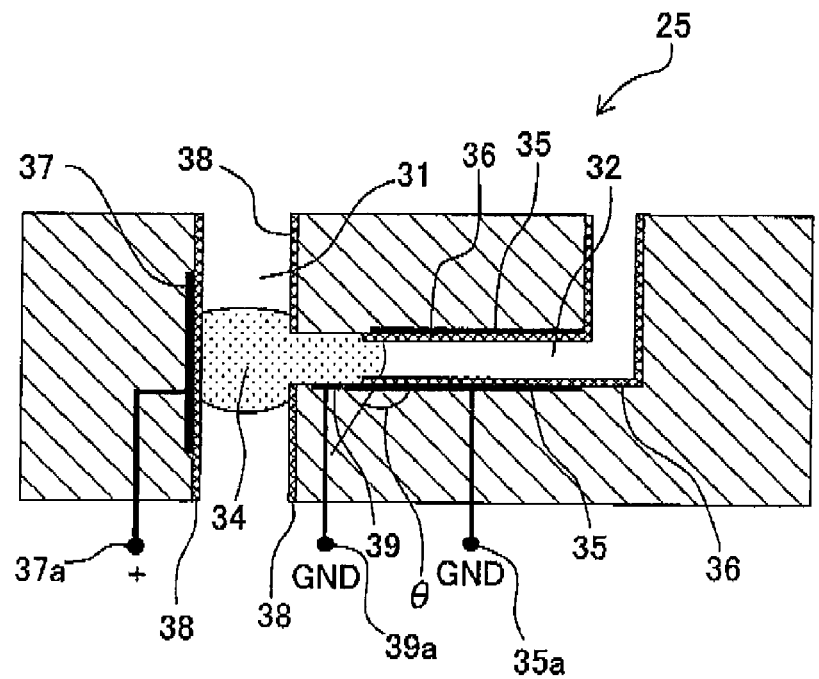
FIG. 8 is a sectional view of the valve in a state that a first passage is closed.
Figure 9:
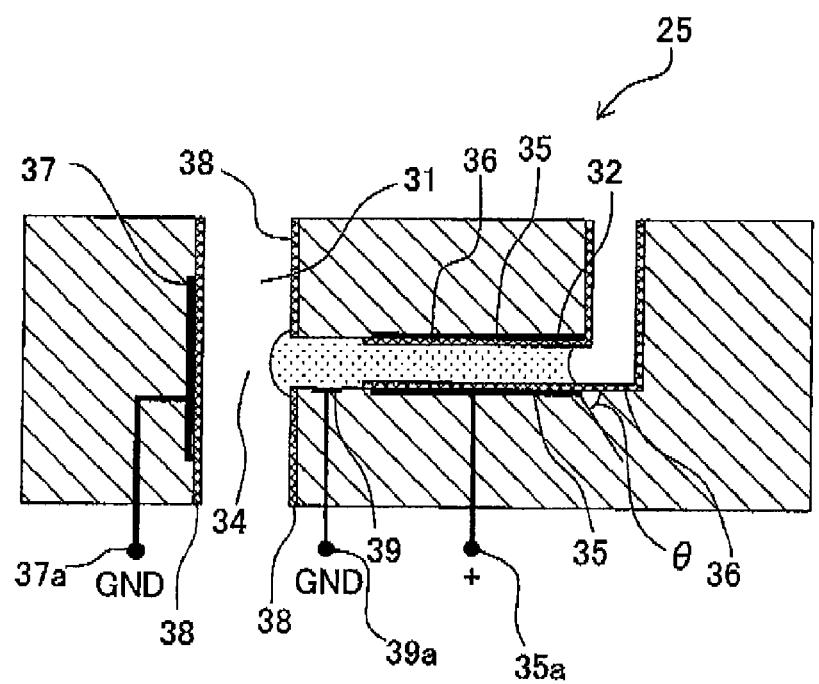
FIG. 9 is a sectional view of the valve in a state that the first passage is opened.

Next, with reference to the flowchart of FIG. 7, and to FIGS. 8 and 9, an explanation will be given about a series of operation steps that the ink-jet printer 1 carries out upon performing printing on a recording paper. FIGS. 8 and 9 show the closed and open states, respectively, of the first passage 31 which communicates with the atmosphere-communicating passage 24. In FIG. 7, reference symbol "Si (i=10, 11, 12)" represents a step. In each of FIGS. 8 and 9, the reference symbol "+" each at the connector 37a of the electrode 37 and the connector 35a of the electrodes 35 indicates that the predetermined voltage is applied to the electrode 37 and electrodes 35. In each of FIGS. 8 and 9, "GND" each at the connector 35a of the electrodes 35, the connector 37a of the electrode 37 and the connector 39a of the electrode 39 indicates that the electrodes 35, 37, 39 are at ground potential.

Before a print command is inputted to the control unit 40, as shown in FIG. 8, the electrodes 35 at the second passage 32 are kept at ground potential, and thus the wetting angle of the liquid 34 with respect to the insulating film 36 is greater than the wetting angle of the liquid 34 with respect to the portion which is in the vicinity of the branching position and on which the insulating film 36 is not formed (the liquid repellency is higher). On the other hand, a predetermined voltage is applied to the electrode 37 at the first passage 31, and thus the wetting angle of the liquid 34 with respect to the portion of the insulating film 38 corresponding to the surface of the electrode 37 is partially lowered (the liquid repellency is lower). As a result, the liquid 34 is held in the first passage 31 in the vicinity of the branching position, and further, a portion of the liquid 34 enters into the portion of the second passage 32 at which the insulating film 36 is not formed. Accordingly, the liquid 34 blocks the first passage 31, thereby closing the atmosphere-communicating passage 24, so that the ink in the storage space 22 is prevented from drying.

In this state, when a print command is inputted from the PC 100 to the control unit 40, the driver IC 44 applies the predetermined voltage to the electrodes 35 and stops the voltage application to the electrode 37, so that the electrode 37 has ground potential (S10). As shown in FIG. 9, when the voltage is applied to the electrodes 35, the wetting angle θ of the liquid 34 on the portion of the insulating film 36 at the surface of each of the electrodes 35 is lowered. As a result, the capillary force generated in the second passage 32 moves the liquid 34 from the first passage 31 to the second passage 32. The liquid repellency of the portion, of the wall surface of the second passage 32, in the vicinity of the branching position is always low. Accordingly, the liquid 34 having moved to the second passage 32 is held in an area ranging from the portion of the second passage 32 in the vicinity of the branching position to the portion of the insulating film 36 formed on each of the electrodes 35 where the liquid repellency is lowered temporarily by the voltage application to the electrodes 35.

In this manner, the movement of the liquid 34 to the second passage 32 opens the first passage 31 which has been blocked by the liquid 34, thereby communicating the atmosphere-communicating passage 24 with the atmosphere. Further, since the voltage application to the electrode 37 is stopped at the same time, the wetting angle θ of the liquid 34 on the portion of the insulating film 38 on the surface of the electrode 37 increases, so that the liquid 34 can move easily from the first passage 31 to the second passage 32. Furthermore, since the second passage 32 is smaller in sectional area than the first passage 31, the capillary force generated in the second passage 32 is greater than the capillary force generated in the first passage 31, so that the liquid 34 can move easily from the first passage 31 to the second passage 32.

After the atmosphere-communicating passage 24 is opened in this way, the ink-jet head 3 performs printing on recording paper in accordance with the data inputted from the PC 100 (S11). At this time, since the atmosphere-communicating passage 24 is opened, atmospheric air is introduced through the opened atmosphere-communicating passage 24 into the ink storage space 22 by an amount in accordance with an amount of ink supplied from the storage space 22 to the ink-jet head 3. Accordingly, ink is supplied smoothly to the ink-jet head 3.

Next, when the printing is completed, the driver IC 44 stops the voltage application to the electrodes 35, so that these electrodes 35 have ground potential, and the driver IC 44 applies the predetermined voltage to the electrode 37 (S12). Then, as shown in FIG. 8, the wetting angle θ of the liquid 34 on the portion of the insulating film 36 on the surface of each of the electrodes 35 is increased, thereby moving the liquid 34 from the second passage 32 to the first passage 31. The moved liquid 34 is held again in the first passage 31 in the vicinity of the branching position. Thus, the held liquid 34 blocks the first passage 31, closing the atmosphere-communicating passage 24.

It is preferable that a value of the voltage applied to the electrodes 35 or a material for the insulating film 36 be determined suitably so that the wetting angle θ of the liquid 34 with respect to the portion of the insulating film 36 located on the surface of each of the electrodes 35 is less than 90° when the voltage is applied to the electrodes 35. In this case, the liquid 34 can be moved securely from the first passage 31 to the second passage 32. It is also preferable that the wetting angle θ be not less than 90° when no voltage is applied to the electrodes 35. In this case, the liquid 34 can be moved securely from the second passage 32 to the first passage 31.

As explained above, the valve 25 opens the atmosphere-communicating passage 24 before the printing operation of the ink-jet head 3, and the valve 25 closes the atmosphere-communicating passage 24 after completion of the printing operation. Accordingly, during the printing operation, ink can be supplied from the ink cartridge 2 to the ink-jet head 3 while atmospheric air is introduced through the atmosphere-communicating passage 24 into the ink storage space 22. This makes it possible to supply ink smoothly to the ink-jet head 3. On the other hand, while no printing is performed, the atmosphere-communicating passage 24 is closed so that the ink in the storage space 22 can be securely prevented from drying.

It is constructed such that the voltage application to the electrodes 35 or the electrode 37 lowers the wetting angle of the liquid 34 on the surface of the insulating film 36 or 38 so as to move the liquid 34 between the first passage 31 and the second passage 32, thereby opening or closing the first passage 31. Accordingly, the valve 25 is simple in structure, having no movable part, and differs in structure from a general valve such as solenoid valves. This makes it possible to suppress the manufacturing cost of the ink cartridge 2, and to reduce the noise made while the valve 25 is operating.

The insulating film 36 is not formed at the portion, of the wall surface forming the second passage 32, which is in the vicinity of the branching position. The wetting angle of the liquid 34 with respect to the portion in the vicinity of the branching position is lower than the wetting angle of the liquid 34 on the surface of the insulating film 36 without voltage applied to the electrodes 35. Accordingly, the liquid 34 always partially enters into the second passage 32 in the vicinity of the branching position. Consequently, when the predetermined voltage is applied to the electrodes 35, the liquid 34 moves easily from the first passage 31 to the second passage 32, so that the first passage 31 is opened securely. Conversely, when the voltage application to the electrodes 35 is cut off from this state, the liquid 34 moves easily from the second passage 32 to the first passage 31. This makes the switching operation of the valve 25 more reliable and more responsive.

The electrode 39 is provided on a portion, of the wall surface forming the second passage 32, which is in the vicinity of the branching position. The liquid 34 is kept in contact with the electrode 39 all the time so as to be maintained at ground potential. Accordingly, when the predetermined voltage is applied to the electrodes 35 or the electrode 37, a predetermined potential difference arises between the liquid 34 and the electrodes 35 or the electrode 37. This makes it possible to securely reduce or lower the wetting angle of the liquid 34 at the portion of the insulating film 36 on the surface of each of the electrodes 35 or at the portion of the insulating film 38 on the surface of the electrode 37. In other words, since the liquid 34 can be moved securely between the first passage 31 and the second passage 32, making the switching operation of the valve 25 more reliable and more responsive.

In this embodiment, the liquid acts as a valve. Accordingly, only by suitably setting the wettability of the insulating film (the wetting angle of the liquid) in the first passage, it is possible to close the first passage easily and securely without considering special design even if the first passage is complicated in sectional shape.

Next, explanation will be given about modification of the first embodiment in which various changes are made to the first embodiment. Parts or components of the modifications which are same in structure with those in the first embodiment are designated with same reference numerals, and explanation therefor will be omitted appropriately.

Modification 1

Figure 10:
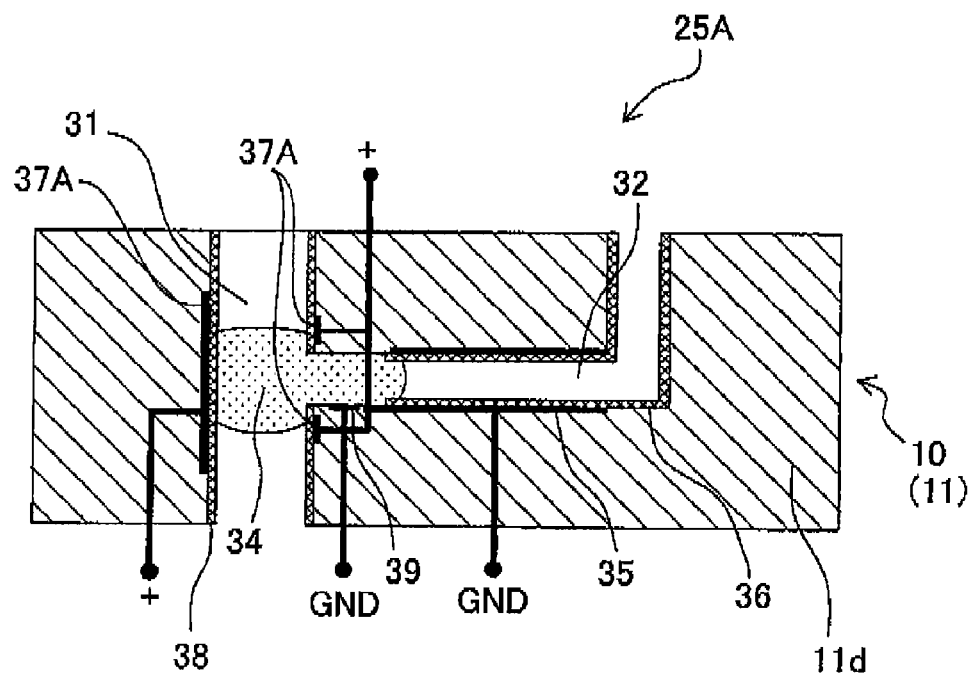
FIG. 10 is a sectional view of a modification 1, corresponding to FIG. 5.

The positions of the electrodes 35, 37 and 39 on the wall surfaces forming the first passage 31 and second passage 32, respectively, are not limited to those in the first embodiment. For example, the electrode 35 may be formed either one of an upper inner surface and a lower inner surface of the groove 11*h*. Alternatively, as a valve 25A shown in FIG. 10, electrodes 37A may be formed on the right and left walls forming the first passage 31. In this case, when voltage is applied to the electrodes 37A, the capillary force generated in the first passage 31 is great, so that the liquid 34 moves easily from the second passage 32 to the first passage 31.

Modification 2

It is not necessarily indispensable the insulating films 36 and 38 are formed entirely on the wall surfaces of the first passage 31 and second passage 32, respectively, and it is sufficient that the insulating films 36 and 38 are formed at least on the surfaces of the electrodes 35 and 37 respectively.

Modification 3

Figure 11:
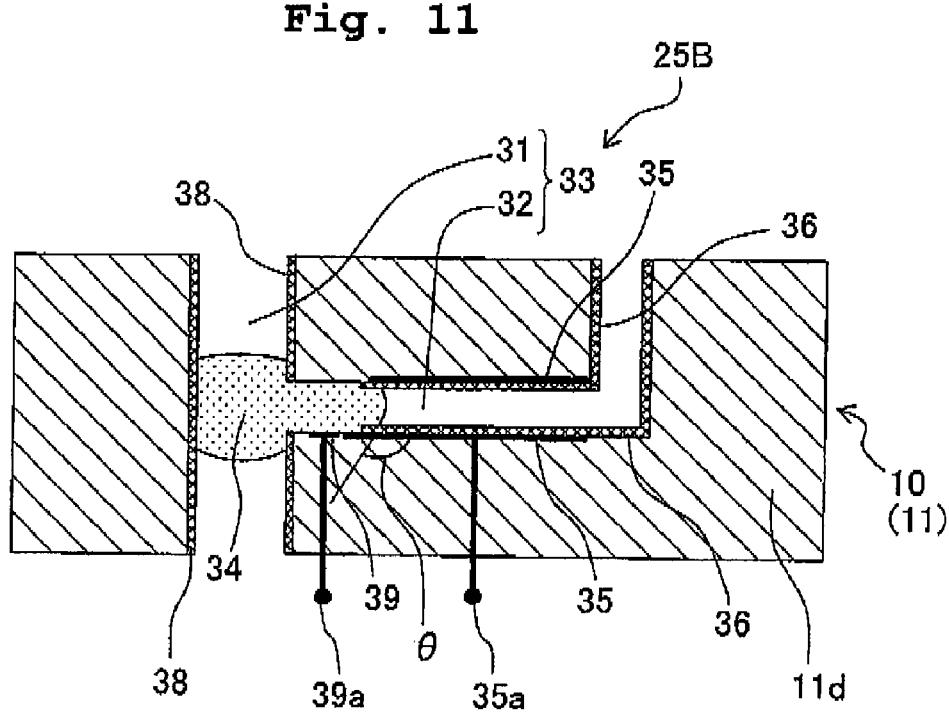
FIG. 11 is a sectional view of a modification 3, corresponding to FIG. 5.

As in a valve 25B shown in FIG. 11, it is possible to omit the electrode 37 in the first passage 31. In this case also, it is possible to move the liquid 34 to the second passage 32 by applying voltage to the electrodes 35 in the second passage 32, and to move the liquid 34 to the first passage 31 by stopping the voltage application to the electrodes 35, thereby making it possible to open and close the first passage 31 (atmosphere-communicating passage 24).

Modification 4

Figure 12:
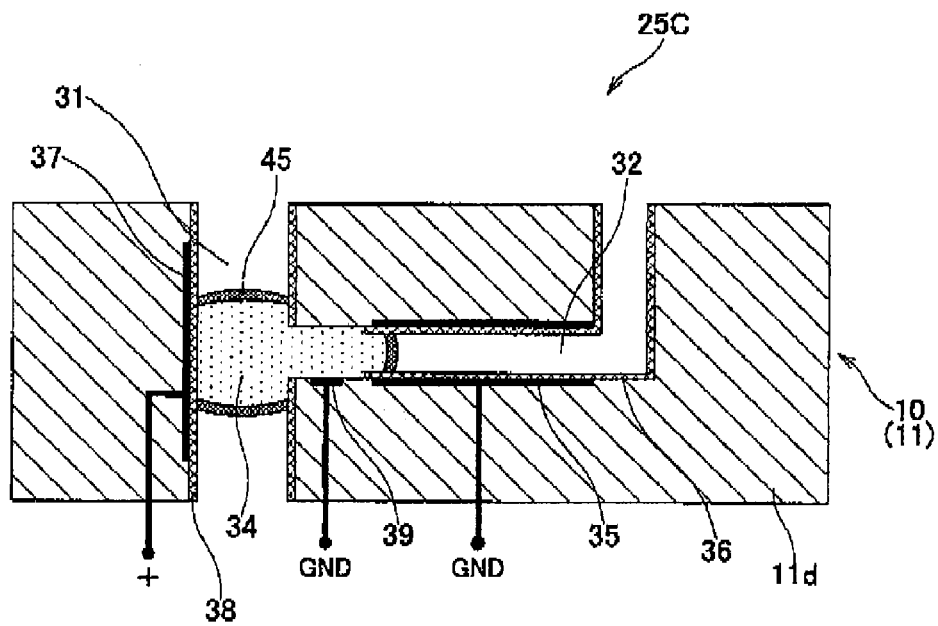
FIG. 12 is a sectional view of a modification 4, corresponding to FIG. 5.

When the liquid 34 is a volatile liquid such as water, as in valve 25C shown in FIG. 12, surfaces of portions of the volatile liquid 34, which are not in contact with the wall of the passage 33, may be covered with a non-volatile liquid 45 (second liquid) such as oil. In this case, the non-volatile liquid 45 prevents the evaporation of the volatile liquid 34, lengthening the life of the valve 25C.

Modification 5

Figure 13:
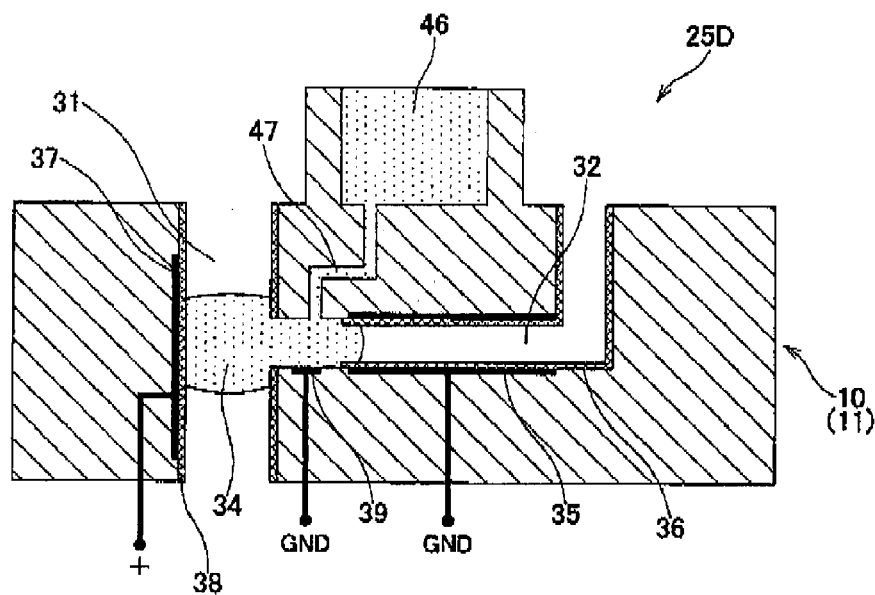
FIG. 13 is a sectional view of a modification 5, corresponding to FIG. 5.

The valve may have a structure for supplying the liquid 34. For example, a valve 25D shown in FIG. 13 has a liquid storage chamber 46 (liquid supply source) which stores the liquid 34. The storage chamber 46 is connected to the second passage 32 by a liquid supply passage 47. When the amount of liquid 34 decreases due to evaporation or the like, the liquid 34 is supplied from the supply chamber 46 through the supply passage 47.

Modification 6

The valve 25 may be constructed such that a predetermined voltage is applied to the electrodes 35 by the driver IC 44 periodically for predetermined lengths of time. When no printing is performed for a long period of time, the atmosphere-communicating passage 24 is not consequently opened by the valve 25 for this long period of time. As a result, in some cases, the pressure in the ink storage space 22 in the cartridge body 10 rises excessively or become negative due to the temperature change and/or pressure change of the atmospheric air. Therefore, for example, when it is constructed such that, when the control unit 40 of the ink-jet printer 1 determines that a predetermined length of time has passed after the completion of previous printing, the driver IC 44 applies a predetermined voltage to the electrodes 35 for a predetermined length of time, it is possible to open the atmosphere-communicating passage 24 periodically so that the air pressure difference between the inside and outside of the cartridge body 10 can be always kept to be low.

Second Embodiment

Next, a second embodiment of the present invention will be explained. The first embodiment is an example in which the present invention is applied to a valve for opening the atmosphere-communicating passage of an ink cartridge. However, the objects to which the present invention can be applied are not limited to ink cartridges. The second embodiment, which will be explained below, is an example in which the present invention is applied to a nozzle cap provided on the ink discharge surface of an ink-jet head so as to prevent the ink in the nozzles of the ink-jet head from drying.

Figure 14:
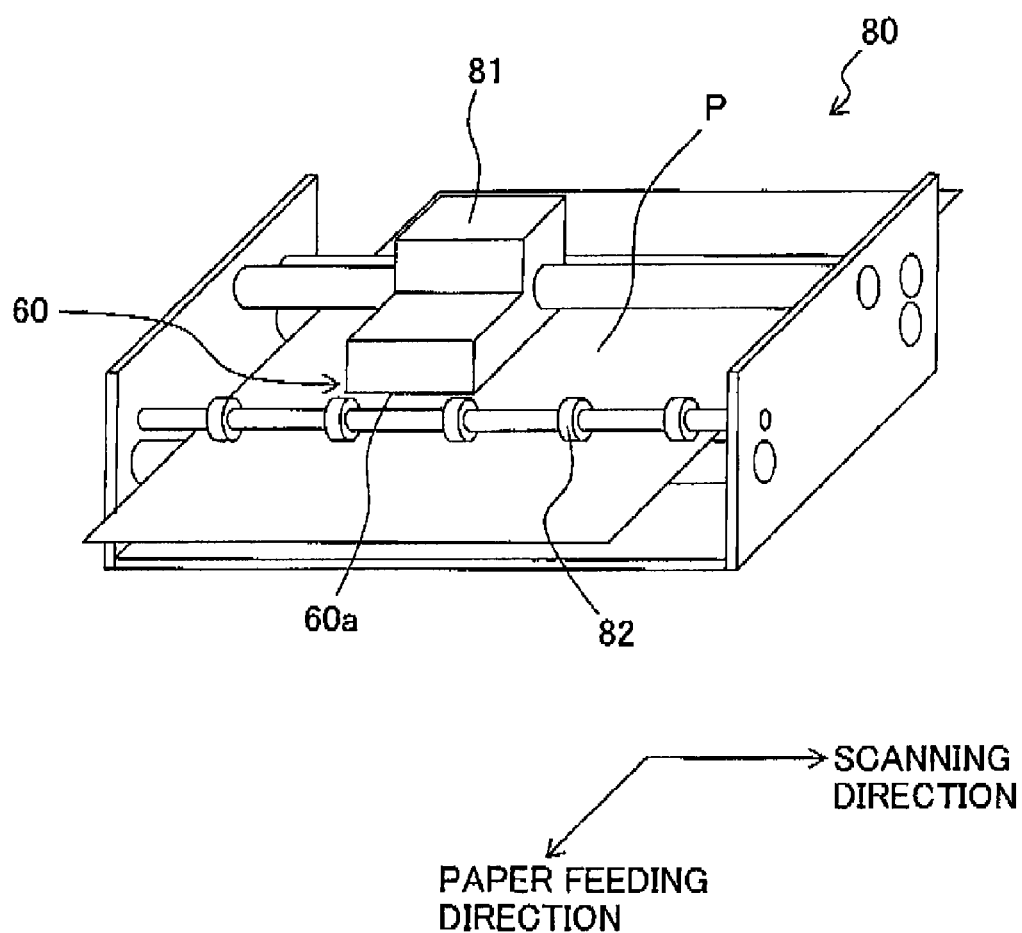
FIG. 14 is a schematic diagram of an ink-jet printer according to a second embodiment of the present invention.

FIG. 14 is a schematic perspective view of an ink-jet printer 80 according to the second embodiment. As shown in FIG. 14, the ink-jet printer 80 has a carriage 81 reciprocapable in left and right direction in FIG. 14; a serial ink-jet head 60 which is provided on the ink-jet head 80 and which discharges an ink onto a recording paper P; feed rollers 82 which feed or transport the recording paper P in a forward direction of FIG. 14; a control unit 51 (see FIG. 17) which controls various operations of the ink-jet printer 80 including discharging operation of the ink-jet head 60, reciprocation of the carriage 81 and the paper feeding operation of the feed rollers 82, and the like. The ink-jet head 60 moves right and left (scanning direction) integrally or together with the carriage 81 which is driven by a carriage drive section 58 (see FIG. 17), and the ink-jet head 60 discharges ink onto the recording paper P through ejection ports of a plurality of nozzles 63 (see FIG. 15) formed on an ink discharge surface 60*a* on a lower surface of the ink-jet head 60. The recording paper P, with an image recorded thereon by the ink-jet head 60, is discharged by the feed rollers 82 in the forward direction (in the paper feeding direction).

The carriage 81 is constructed to be movable to a stand-by position at an area which is outside of an area in which the recording paper P is fed (paper feeding area) in a width direction (left and right direction in FIG. 14) thereof (for example, the right end in FIG. 14). A nozzle cap 64 (see FIG. 15) is arranged at the stand-by position and is constructed to be driven up and down (vertically) by a cap drive section 59 (see FIG. 17). When no ink is discharged through the nozzles 63, the ink-jet head 60 is moved together with the carriage 81 to the stand-by position, at which the nozzle cap 64 is then attached detachably to the ink-jet head 60 so as to cover the ink discharge surface 60*a* from below.

Figure 15:
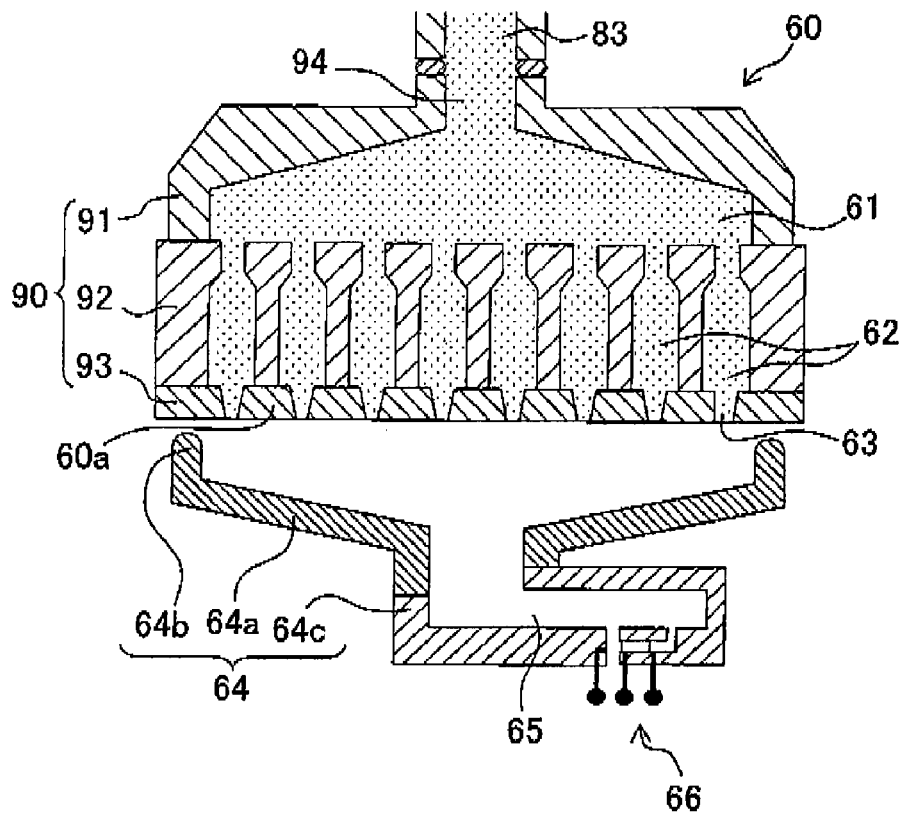
FIG. 15 is a vertical section of an ink-jet head in a state that a nozzle cap is attached to the ink-jet head.

Next, the ink-jet head 60 and the nozzle cap 64 will be explained in more detail with reference to FIG. 15. FIG. 15 is a vertical section of the ink-jet head 60 in a state that the cap 64 is attached to the ink-jet head 60. As shown in FIG. 15, the ink-jet head 60 has a channel unit 90 which is connected to an ink cartridge (not shown) via a tube 83. The channel unit 90 is constructed of three plates 91, 92 and 93 staked together in a layer form. A manifold 61 and an ink supply passage 94 communicating the manifold 61 and the tube 83 are formed in the uppermost plate 91. A plurality of ink channels 62 branched off from the manifold 61 and extending downwardly is formed in the middle plate 92. Further, a plurality of nozzles 63 communicating with the ink channels 62, respectively, are formed in the lowermost plate 93, and the lower surface of the plate 93 is an ink discharge surface 60*a* on which the nozzles 63 are open. The ink flowed from the tube 83 into the manifold 61 is discharged from the nozzles 63 via the ink channels 62.

The nozzle cap 64 includes a cap portion 64a, a contact portion 64b and a base portion 64c. The cap portion 64a is nearly equal in area to the ink discharge surface 60a and covers the of the nozzles 63 from below. The contact portion 64b extends upwardly from the peripheral edge of the cap portion 64a and is capable of tightly contacting with an area, on the ink discharge surface 60a, which surrounds the ejection ports of the nozzles 63. The base portion 64c supports the cap portion 64a from below. The cap portion 64a and the contact portion 64b are formed of an elastic material such as synthetic resin. The base portion 64c has a communication passage 65 which is formed therein and which communicates a space 95 (see FIG. 19) with the outside of the nozzle cap 64, the space 95 being defined by the cap portion 64a, the contact portion 64b and the ink discharge surface 60a when the nozzle cap 64 is attached to the ink-jet head 60. Further, the base portion 64c is provided with a valve 66 which is capable of opening and closing the communicating passage 65.

Figure 16:
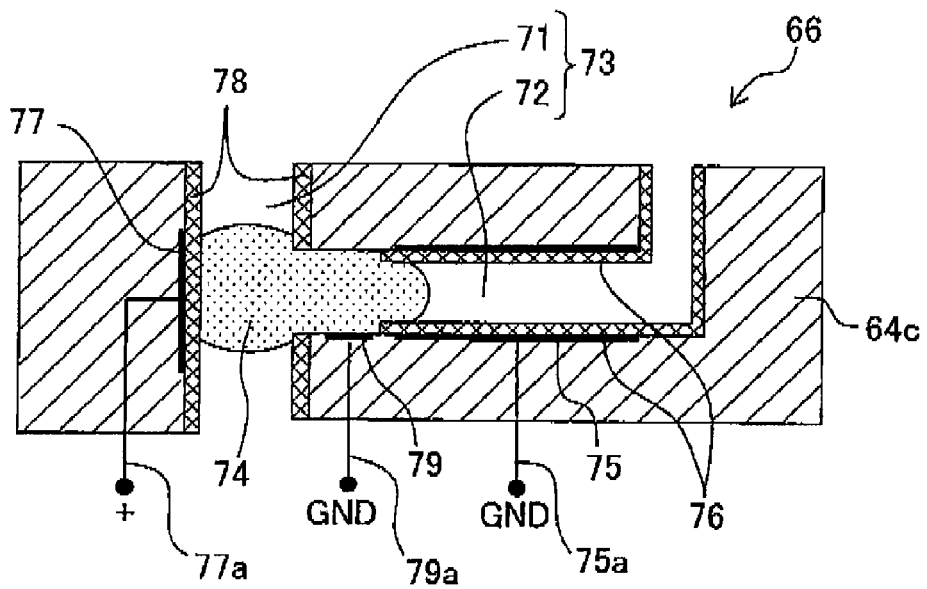
FIG. 16 is an enlarged sectional view of the valve shown in FIG. 15.

The valve 66 has a structure similar to that of the valve 25 (see FIG. 5) according to the first embodiment. The structure of the valve 66 will be explained briefly below. As shown in FIG. 16, the valve 66 has a passage 73 (an internal passage) having a first passage 71 which communicates the communicating passage 65 with the outside of the nozzle cap 64, and a second passage 72 which branches off from the first passage 71; an electrode 75 (first electrode) which is formed on a wall surfaces of the base portion 64c, defining the second passage 72; an electrode 77 (second electrode) which is formed on a wall surface, of the base portion 64c, defining the first passage 71; a driver IC 57 (voltage applying unit: see FIG. 17) which applies a predetermined voltage selectively to either one of the two kinds of electrodes 75, 77; and an insulating film 76 provided on a surface of the electrode 75; and an insulating film 78 provided on a surface of the electrode 77.

An electrically conductive liquid 74 is enclosed in the passage 73. The valve 66 opens and closes the first passage 71 by moving the liquid 74 between the first passage 71 and the second passage 72. The electrodes 75 and 77 are connected to the driver IC 57 (see FIG. 17) via connectors 75a and 77a, respectively. The driver IC 57 applies the predetermined voltage selectively to either one of the electrodes 75 and 77, and the other one of the electrodes 75 and 77, to which no voltage is applied, is kept at ground potential. Also, an electrode 79 (third electrode) is formed on the wall surface defining the second passage 72, at a position in the vicinity of a junction position, and this electrode 79 is kept at ground potential at all time via a connector 79a.

The insulating films 76 and 78 function similarly to the insulating films 36 and 38, respectively, of the first embodiment. Namely, when the predetermined voltage is applied to the electrodes 75, a wetting angle of the liquid 74 with respect to a portion of the insulating film 76 on the surface of each of the electrodes 75 (corresponding to the first insulating film of the present application) is lowered. On the other hand, when the predetermined voltage is applied to the electrode 77, a wetting angle of the liquid 74 with respect to a portion of the insulating film 78 on the surface of the electrode 77 (corresponding to the second insulating film of the present application) is lowered.

Thus, the application of the predetermined voltage from the driver IC 57 to the electrodes 75 lowers the wetting angle of the liquid 74 with respect to the portion of the insulating film 76 on the surface of the electrode 75, so as to move the liquid 74 from the first passage 71 to the second passage 72, thereby opening the first passage 71. Further, the application of the predetermined voltage from the driver IC 57 to the electrode 77 lowers the wetting angle of the liquid 74 with respect to the portion of the insulating film 78 on the surface of the electrode 77, so as to move the liquid 74 from the second passage 72 to the first passage 71, thereby closing the first passage 71.

Figure 17:
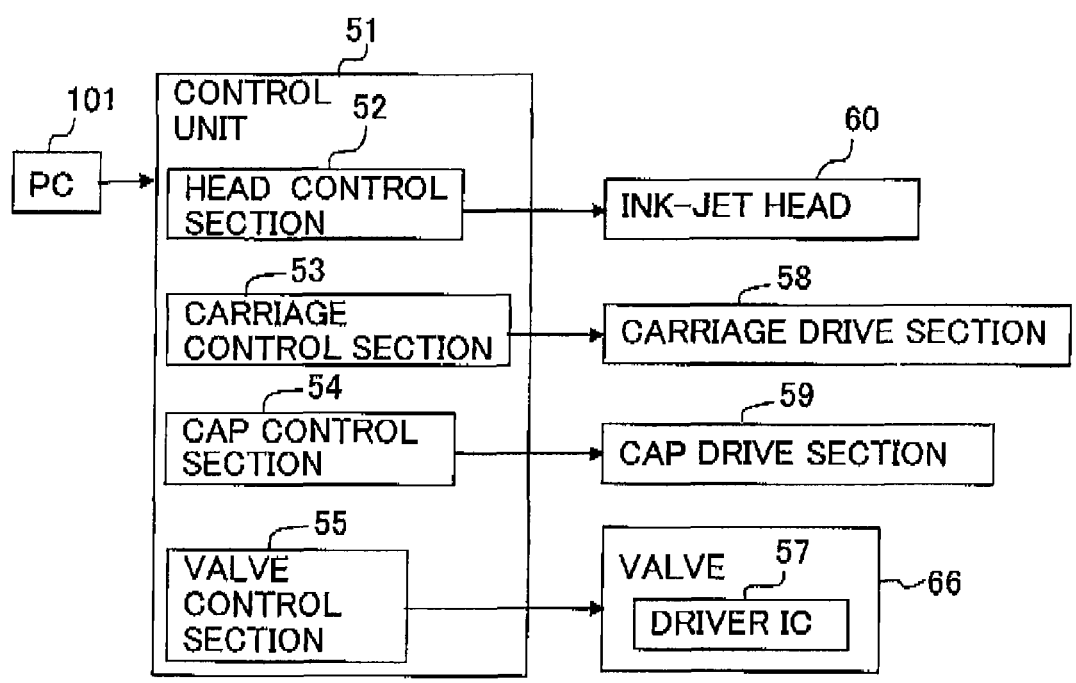
FIG. 17 is a block diagram showing the electrical configuration of the ink-jet printer according to the second embodiment.

Next, the electrical configuration of the ink-jet printer 80 according to this embodiment will be explained by using the block diagram of FIG. 17. The control unit 51 has a CPU which is a central processing unit; a ROM storing programs and data and the like for controlling the overall operation of the ink-jet printer 80; a RAM temporarily storing data processed by the CPU; and the like. As shown in FIG. 17, the control unit 51 also includes a head control section 52 which controls the ink discharging operation of the ink-jet head 60; a carriage control section 53 which controls reciprocating operation of the carriage 81 by the carriage drive section 58; a cap control section 54 which controls the vertically moving operation of the nozzle cap 64 by the cap drive section 59; and a valve control section 55 which controls the opening/closing operation of the nozzle cap 64 by the valve 66.

When a print command is inputted from a PC 101 to the control unit 51, the carriage control section 53 so controls the carriage drive section 58 as to reciprocate the carriage 81, and at the same time, the head control section 52 so controls the ink-jet head 60 that ink is discharged onto recording paper. The cap control section 54 so controls the cap drive section 59 that, after the completion of printing, the nozzle cap 64 is lifted to be attached to the ink discharge surface 60a of the ink-jet head 60 which has moved to the stand-by position, and that, just before printing is started, the cap 64 is lowered to be removed from the discharge surface 60a. Further, the valve control section 55 so controls the driver IC 44 of the valve 25 that the communicating passage 65 is opened before the nozzle cap 64 is attached to the ink discharge surface 60a, and that this passage 65 is closed when the attachment of the cap 64 to the ink discharge surface is completed. Each of the head control section 52, the carriage control section 53, the cap control section 54 and the valve control section 55 is constructed of a CPU, a ROM, a RAM, and the like.

Figure 18:
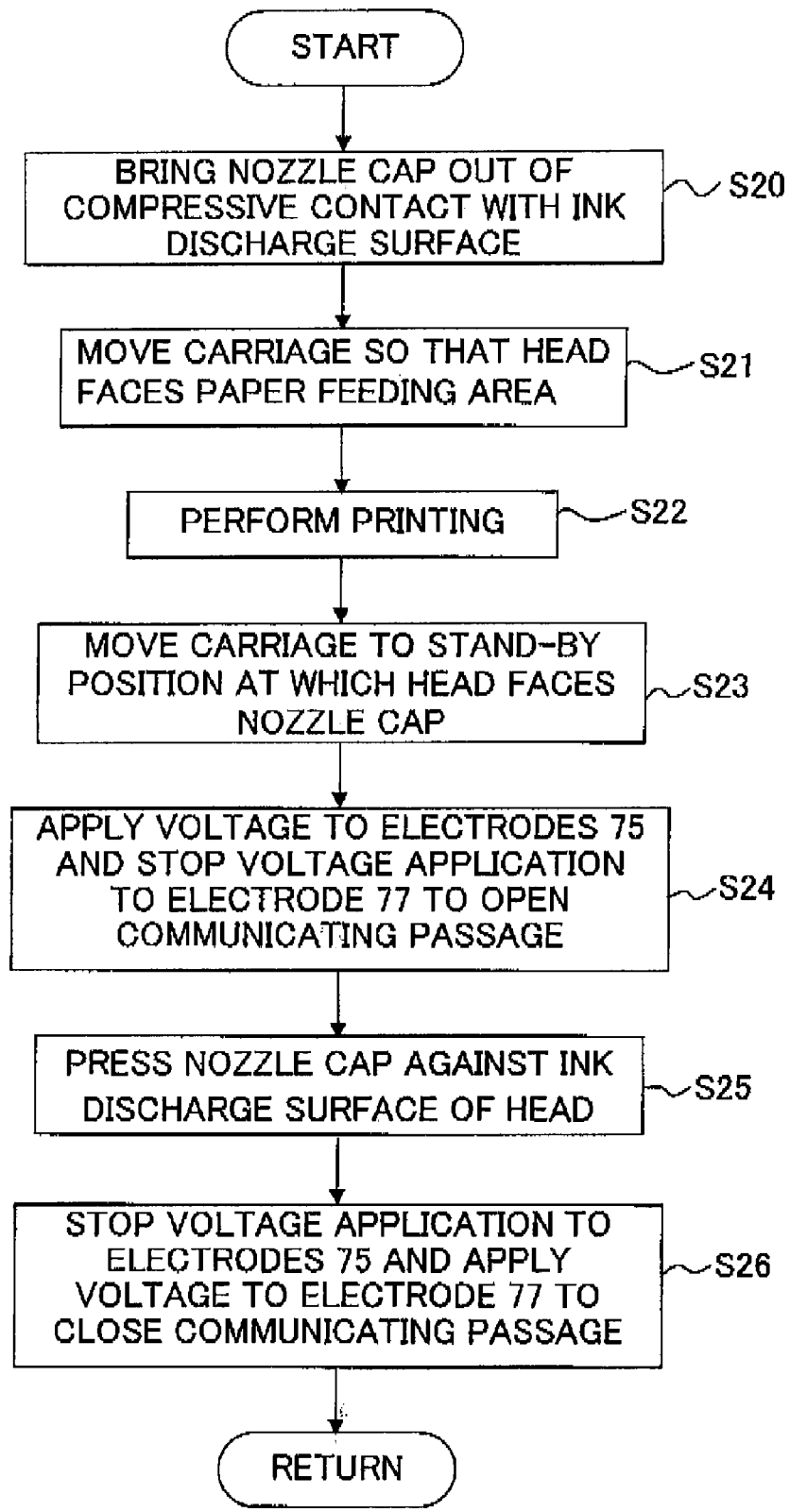
FIG. 18 is a flowchart of the series of operation steps performed by an ink-jet printer which include its printing operation.

Next, with reference to the flowchart of FIG. 18 and to FIGS. 19 and 20, an explanation will be given about the series of operation steps, including printing, performed by the ink-jet printer 80. In a state that the ink-jet head 60 is not performing printing, the carriage 81 is in the stand-by position outside the paper feeding area, and as shown in FIG. 19(a), the contact portion 64b of the nozzle cap 64 is in close contact with the ink discharge surface 60a of the ink-jet head 60, which is provided to the carriage 81, and the ink discharge surface 60a is covered with the cap portion 64a.

At this time, as shown in FIG. 19(b), in the valve 66, no voltage is applied to the electrodes 75 (having ground potential), and thus the wetting angle θ of the liquid 74 with respect to the portion of the insulating film 76 on the surface of the electrode 75 remains to be high. On the other hand, the predetermined voltage is applied to the electrode 77, and thus the wetting angle θ of the liquid 74 with respect to the portion of the insulating film 78 on the surface of the electrode 77 is lowered than that when no voltage is applied to the electrode 77. As a result, the liquid 74 is held at a position, of the first passage 71, in the vicinity of the branching position, and a portion of the liquid 74 is entered and held in a portion of the second passage 72 at which the electrode 75 is not formed. Therefore, this liquid 74 blocks the first passage 71 to close the communicating passage 65, thereby preventing the ink in the nozzles 63 from drying.

In this situation, when a print command is inputted from the PC 101 to the control unit 51, the cap drive section 59 lowers the nozzle cap 64 so that the nozzle cap 64 is separated and away from the ink discharge surface 60a, thereby releasing the nozzle cap 64 out of compressive contact with the ink discharge surface 60a (S20). Then, the carriage 81 is moved away from the stand-by position so that the ink-jet head 60 faces the paper feeding area (S21). Then, the ink-jet head 60 and the carriage 81 perform printing (S22). After the completion of printing, the carriage 81 is returned to the stand-by position again (S23).

Subsequently, the driver IC 57 applies the predetermined voltage to the electrodes 75 and stops the voltage application to the electrode 77 (S24). Consequently, while the wetting angle of the liquid 74 with respect to the portion of the insulating film 76 on the surface of each of the electrodes 75 is lowered, the wetting angle of the liquid 74 with respect to the portion of the insulating film 78 on the surface of the electrode 77 is increased. As a result, the liquid 74 moves from the first passage 71 to the second passage 72, thereby opening the first passage 71 (the communicating passage 65).

Then, the cap drive section 59 lifts the nozzle cap 64 to be pressed against the ink discharge surface 60a (S25), thereby bringing the contact portion 64b of the cap into close contact with the ink discharge surface 60a. At this time, since the communicating passage 65 is opened, the pressure rise in the space 95 generated by the attaching operation of the nozzle cap 64 to the ink discharge surface 60a is alleviated or reduced. Accordingly, it is possible to prevent the menisci in the nozzles 63 from being broken by the pressure rise.

After the nozzle cap 64 is thus attached to the ink discharge surface 60a, the driver IC 57 stops the voltage application to the electrodes 75 and applies the predetermined voltage to the electrode 77 (S26). Then, while the wetting angle θ of the liquid 74 with respect to the portion of the insulating film 76 on the surface of each of the electrodes 75 is increased, the wetting angle of the liquid 74 with respect to the portion of the insulating film 78 on the surface of the electrode 77 is lowered. As a result, the liquid 74 moves from the second passage 72 to the first passage 71, thereby blocking and closing the first passage 71. Accordingly, the communicating passage 65 is closed to tightly close the space 95, thereby preventing the ink in the nozzles 63 from drying. Alternatively, after a print command is input to the control unit 51, the first passage 71 may be once opened before the nozzle cap 64 is moved separately from the ink discharge surface 60a (S20), and the first passage 71 may be closed just after the step S20. This makes it possible to reduce the pressure fluctuation caused in the space 95 at the moment when the nozzle cap 64 is moved off the ink discharge surface 60a, thereby preventing the breakage of the menisci formed in the nozzles 63.

In the ink-jet printer 80 according to the second embodiment as explained above, when printing is completed, although the nozzle cap 64 is attached to the ink discharge surface 60a of the ink-jet head 60, the valve 66 opens the communicating passage 65 before the nozzle cap 64 is brought into compressive contact with the ink discharge surface 60a. This makes it possible to reduce the pressure rise caused in the space 95 between the ink discharge surface 60a and the cap portion 64a of the nozzle cap 64 when the cap 64 comes into contact with the ink discharge surface 60a. After the nozzle cap 64 is attached to the ink discharge surface, the valve 66 closes the communicating passage 65, thereby preventing the ink in the nozzles 63 from drying.

For the second embodiment also, it is possible to make various changes similar to the changes (modifications 1 to 6) made to the first embodiment, with respect to positions of the electrodes and insulating films, and the like.

Third Embodiment

Figure 21:
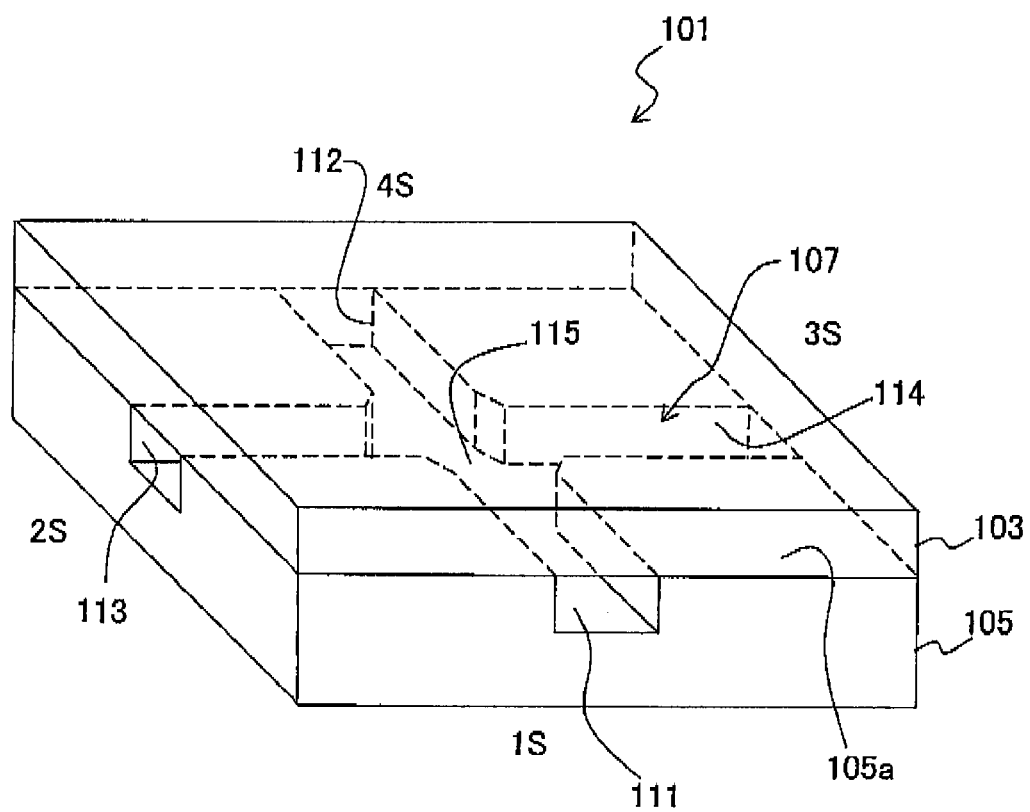
FIG. 21 is a drawing conceptually showing a channel structure according to a third embodiment of the present invention.

In the first embodiment, the opening and closing of the first passage are controlled by changing the capillary force or wetting angle of the liquid in the second passage. In the third embodiment, an explanation will be given about a channel structure which has a plurality of channels and which is provided with an opening-closing mechanism for selectively controlling the liquid flow in the channels. As shown in FIG. 21, a channel structure 101 is constructed by overlapping an upper plate 103 and a lower plate 105, and a cruciform channel 107 is formed on an upper surface 105a of the lower plate 105. The channel 107 has a recess (crossing portion) 115 formed at the center of the upper surface 105a of the upper plate 105. The channel 107 is structured such that a first groove (first channel) 111, a second groove (second channel) 112, a third groove (third channel) 113, and a fourth groove (fourth channel) 114 are extended from the recess 115 radially at angular intervals of 90 degrees. The grooves are rectangular in cross section and equal in sectional area. The first channel 111 communicates with a first space 1S, the second channel 112 communicates with a fourth space 4S, the third channel 113 communicates with a second space 2S, and the fourth channel 114 communicates with a third space 3S.

Figure 22:
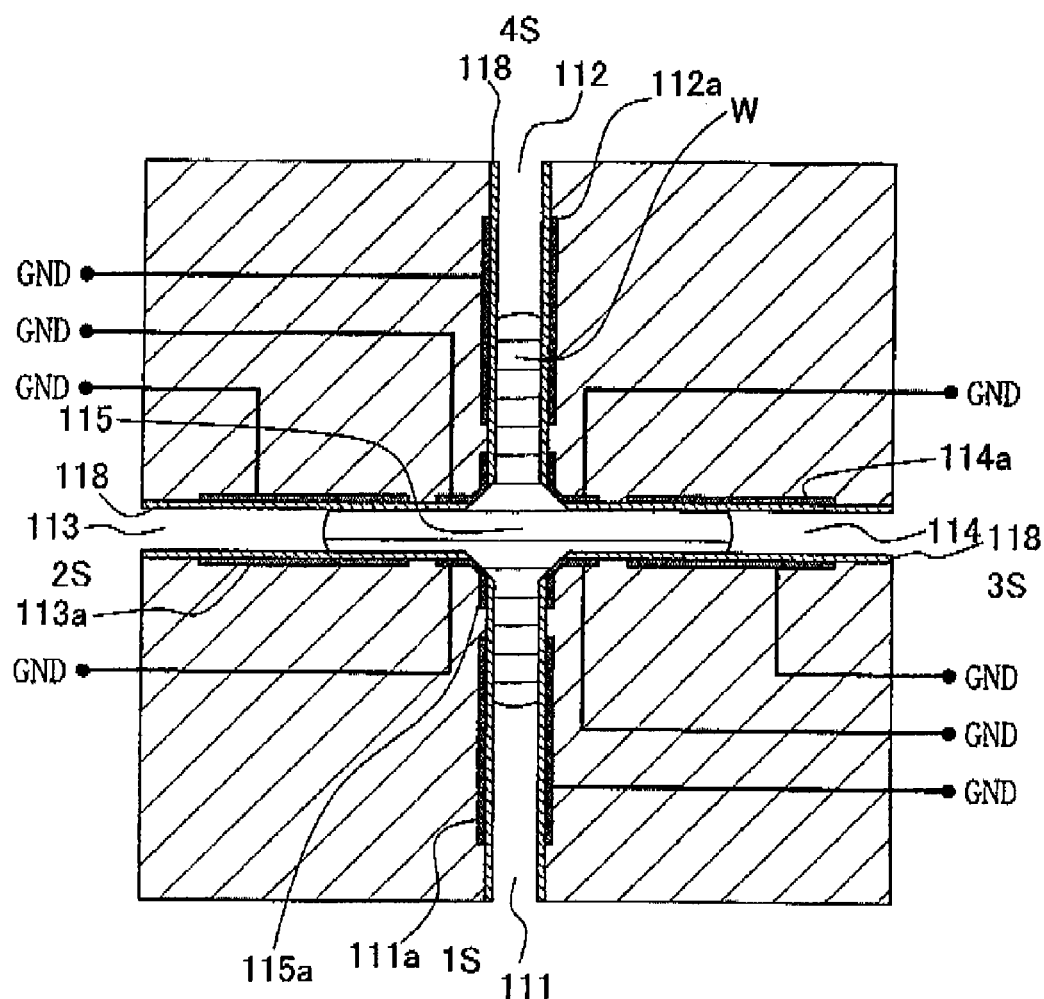
FIG. 22 is a plan view of channels (lower plate) of the channel structure according to the third embodiment, showing a state that prevents gas from communicating through the channels.

As shown in FIG. 22, first electrodes 111a are embedded in side walls facing each other in the first channel 111; second electrodes 112a are embedded in side walls facing each other in the second channel 112; third electrodes 113a are embedded in side walls facing each other in the third channel 113; and fourth electrodes 114a are embedded in side walls facing each other in the fourth channel 114. Further, fifth electrodes 115a are formed on side walls (peripheral walls) of the crossing portion 115, respectively, to be extended from the side walls to portions of the first to fourth channels 111 to 114, respectively. Furthermore, insulating films 118 made of tetrafluoroethylene are formed in the first to fourth channels 111 to 114 and in the crossing portion 115 so as to cover these electrodes 111a to 115a, respectively. A predetermined voltage is applied selectively to the electrodes 111a to 115a from an unillustrated voltage applying unit (for example, the driver IC in FIG. 6) or a power source (not shown), In the channel 107, water W is enclosed as an electrically conductive liquid.

As shown in FIG. 22, when no voltage is applied to the first to fourth electrodes 111a to 114a and to the fifth electrode 115a and thus all of the electrodes have ground potential, the capillary force in the channels 111 to 114 are mutually equal because these channels are equal in sectional area. Therefore, the water W fills the crossing portion 115 and adjacent portions to the crossing portion 115 by a same length along the channels 111 to 114. Since the crossing portion 115 is filled with the water W, gas is prevented from moving from the first channel 111 to the other channels 112 to 114. In other words, since the water W isolates the channels 111 to 114 from one another, the spaces S1 to S4 do not communicate with one another.

Figure 23:
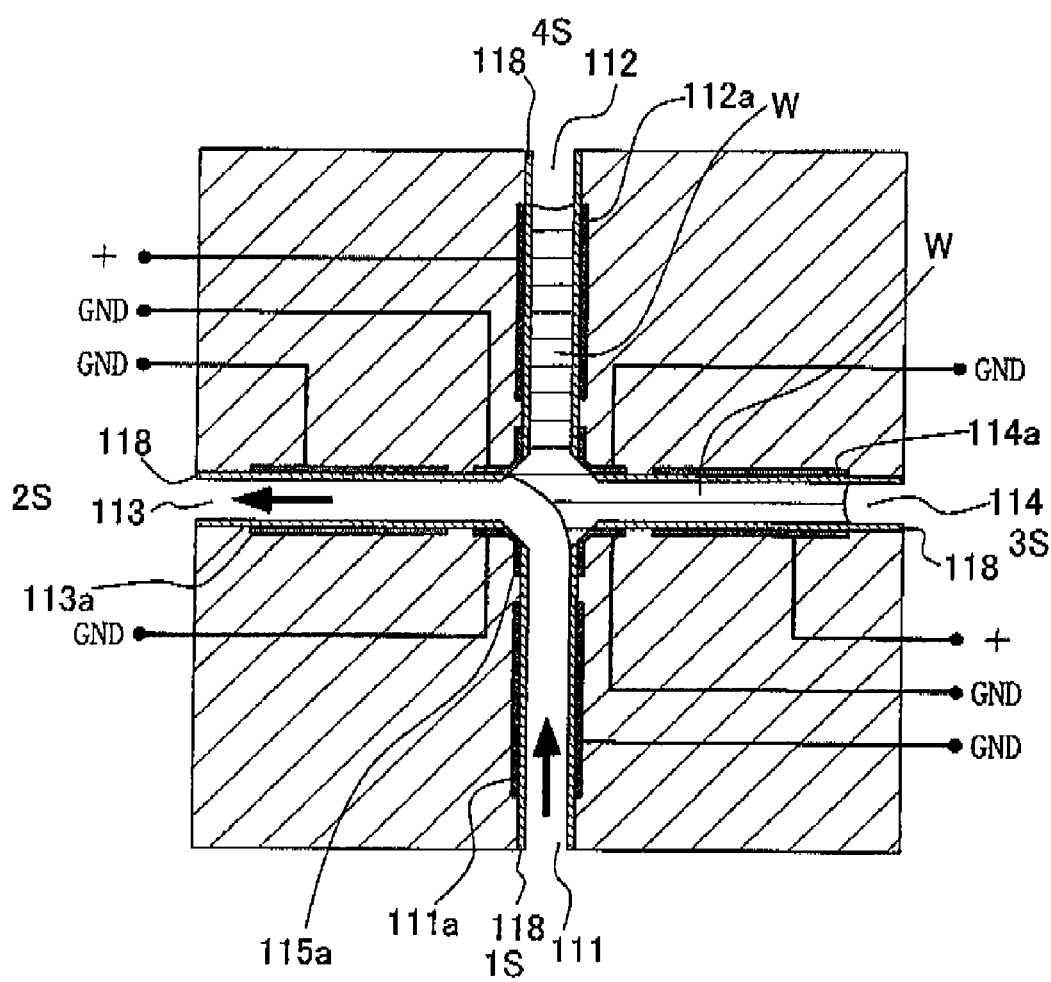
FIG. 23 is a plan view of the channels (lower plate) of the channel structure according to the third embodiment, showing a state in that first and third channels are communicated with each other.

Then, when the predetermined voltage is applied to the second electrode 112a and the fourth electrode 114a, the liquid repellency of the insulating films 118 at areas formed on the second electrodes 112a and the fourth electrodes 114a, respectively, is lowered, thereby reducing the wetting angle of the water W with respect to these areas of the insulating films 118. As a result, the water W moves along the second and fourth channels 112 and 114 which function as capillaries. Accordingly, as shown in FIG. 23, the water W existed in the crossing portion 115 moves to the second and fourth channels 112 and 114, so that a space or void in which the water W is partially absent is formed in the crossing portion 115. Consequently, the first channel 111 and the third channel 113 are communicating with each other via the void formed in the crossing portion 115. According to such a principle, the application of the predetermined voltage to the second and fourth electrodes 112a and 114a enables the first and second spaces S1 and S2 to communicate with each other via the first and third channels 111 and 113 (see the arrows in the drawing).

Figure 24:
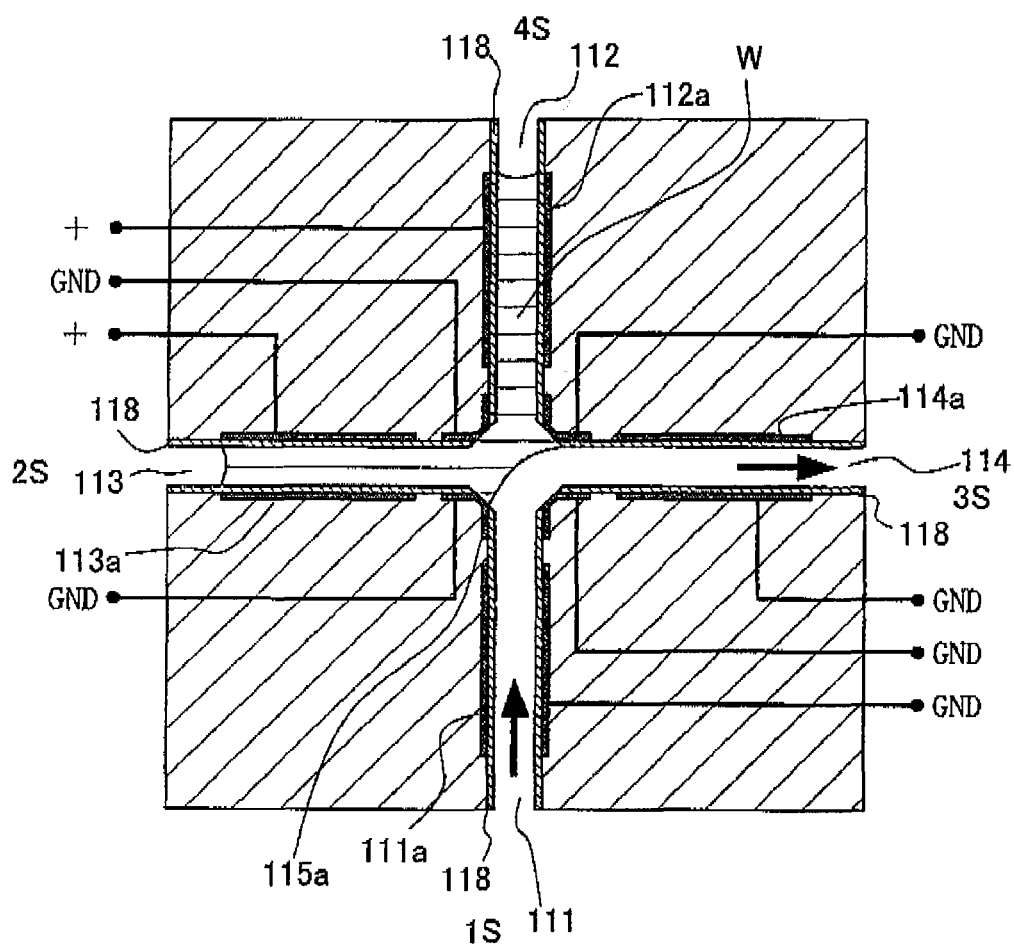
FIG. 24 is a plan view of the channels (lower plate) of the channel structure according to the third embodiment, showing a state in which the first and fourth channels are communicated with each other.

Similarly, as shown in FIG. 24, when the predetermined voltage is applied to the second electrodes 112a and the third electrodes 113a, the liquid repellency of the insulating films 118 at areas formed on the second electrodes 112a and the third electrodes 113a, respectively, is lowered, thereby reducing the wetting angle of the water W with respect to the areas of the insulating films 118. As a result, the water W moves along the second and third channels 112 and 113 which function as capillaries. Accordingly, as shown in FIG. 24, the water W existed in the crossing portion 115 moves to the second and third channels 112 and 113, so that a space or void in which the water W is partially absent is formed in the crossing portion 115. Consequently, the first and fourth channels 111 and 114 are communicated with each other via the void formed in the crossing portion 115. According to such a principle, the application of the predetermined voltage to the second and third electrodes 112a and 113a enables the first and third spaces S1 and S3 to communicate with each other via the first and fourth channels 111 and 114 (see the arrows in the drawing). The passage constructed of the first and second channels 111 and 112 corresponds to the first passage of the present invention, and the third and fourth channels 113 and 114 correspond to the second and third passages, respectively, of the present invention.

Thus, the voltage application to the second electrodes 112a and one of the third and fourth electrodes 113a and 114a enables the gas, flowing into the first channel 111, to flow to a desired space via one of the third and fourth channels 113 and 114. The channel structure 101 can function as a two-way valve. By applying the voltage only to the second electrodes 112a or to the third electrodes 113a so as to flow the gas to two channels, for example, the second and fourth channels, thereby communicating the first space S1 with the third and fourth spaces S3 and S4). Although this embodiment is exemplified by a case in which the channel structure has four channels, not less than 5 channels may be extended from the crossing portion radially. By providing electrodes on the side walls of each of the channels, and by controlling the voltage applied to the electrodes, it is possible to communicate a specific channel (space) and another specific channel (space) among the channels, or to communicate a plurality of channels (plurality of spaces) with each other.

Modification of the Third Embodiment

Figure 25:
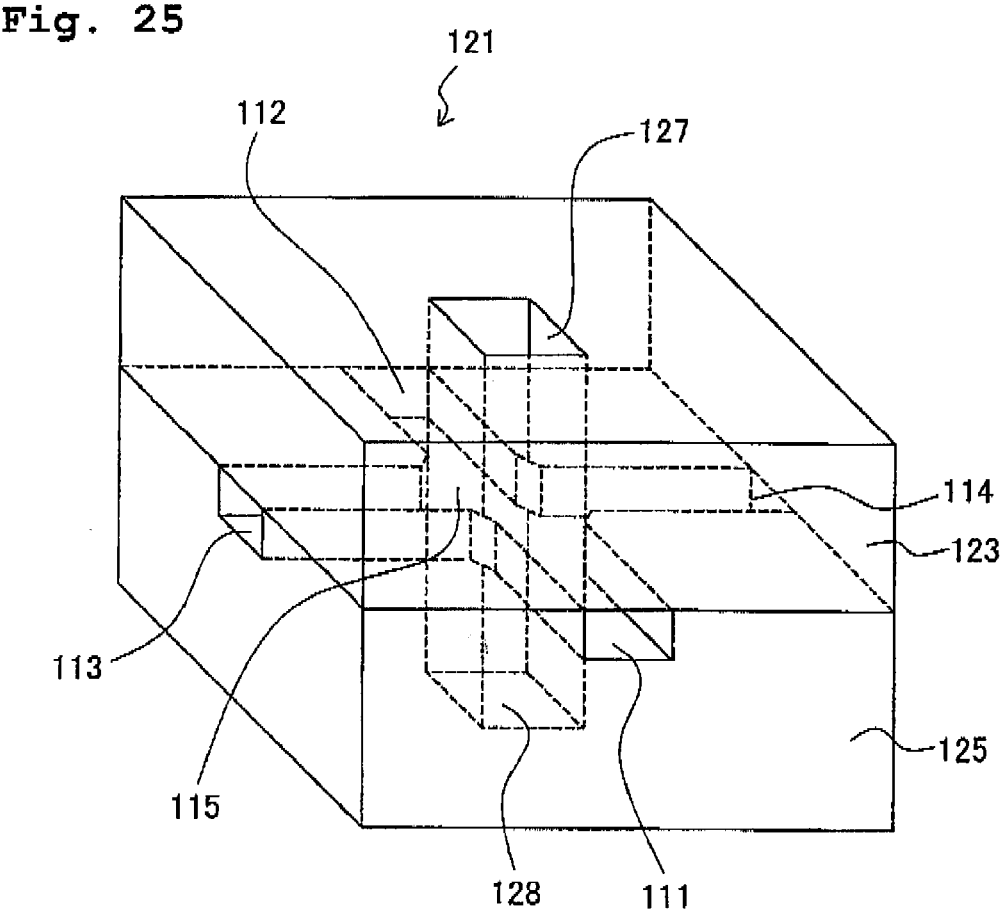
FIG. 25 is a drawing showing a channel structure, of a modification of the third embodiment, in which channels are connected three-dimensionally.

In the foregoing embodiment, the first to fourth channels are formed in planes in parallel with the upper and lower plates. However, as shown in FIG. 25, a channel structure 121 may have an upper plate 123 and a lower plate 125; and a fifth channel 127 and a sixth channel 128, in addition to first to fourth channels 111 to 114 which extend in a plane direction of the upper and lower plates 123 and 125, respectively. The fifth channel 127 is formed in the upper plate 123 such that the fifth channel 127 communicates with the crossing portion 115 and extends in a direction orthogonal to the plane of the upper plate 123. The sixth channel 128 is formed in the lower plate 125 such that the sixth channel 128 communicates with the crossing portion 115 and extends in a direction orthogonal to the plane of the lower plate 125. Thus, in this modification, a plurality of channels is formed three-dimensionally, and the liquid can be flowed from a specific channel to a desired channel of the channels (a multi-valve).

Fourth Embodiment

In this embodiment, an explanation will be given about a novel opening-closing mechanism (and an actuator used in therein) which can be used in place of the valve 25 in the ink cartridge according to the first embodiment. The structure and parts of an ink cartridge and an ink-jet printer using the ink cartridge according to this embodiment are similar to those of the ink cartridge and the ink-jet printer using the ink cartridge as explained in FIGS. 2 to 4. Therefore, any explanation therefor will be omitted. Parts or components, of the opening-closing mechanism of this embodiment, which are common to those of the valve for ink cartridge shown in FIG. 5, are designated with same reference numerals as designated to those in the valve in FIG. 5, and any explanation therefor will be omitted.

Figure 26:
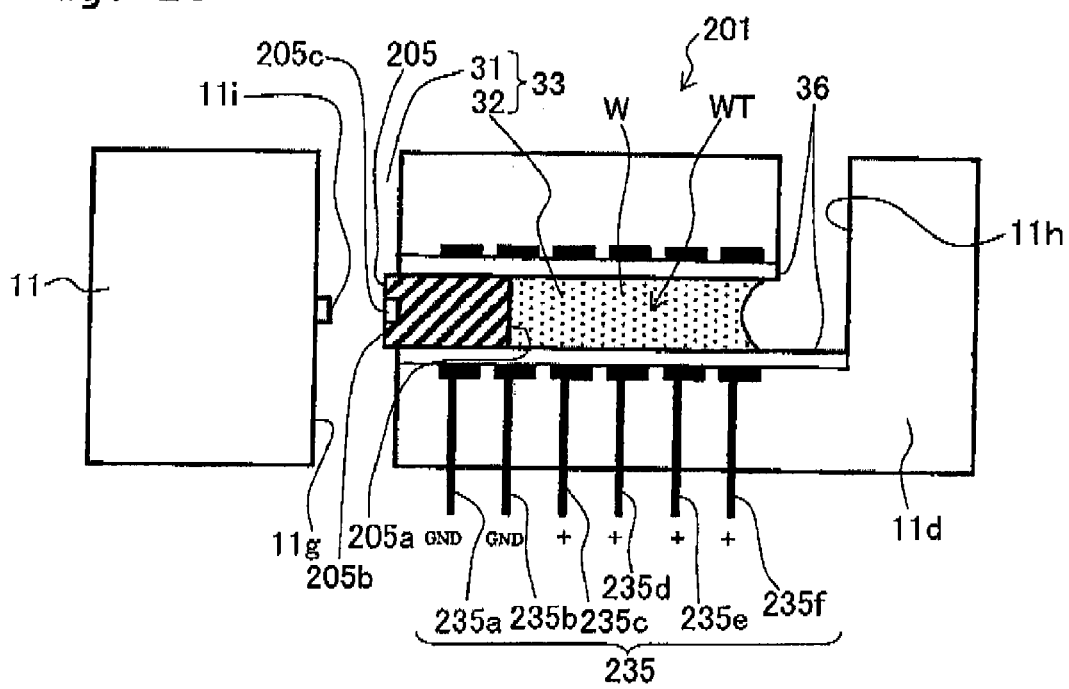
FIG. 26 is a drawing conceptually showing an open state of a channel opening-closing mechanism according to a fourth embodiment of the present invention.

As shown in FIG. 26, a opening-closing mechanism 201 has a first channel 31 and a second channel 32 defined by grooves 11a and 11h, respectively, formed in the first plate member (diameter (width) of the channels: about 4 mm). An electrode 235 constructed of a plurality of pairs of electrodes 235a to 235f are buried in side walls of the second channel 32. These electrodes 235a to 235f are connected to a driver IC (see FIG. 6) and can be applied with voltage individually. Insulating films 36 are formed on side walls of the second channel 32 so as to cover the electrodes 235a to 235f. As shown in FIG. 26, the second channel 32 is filled partially with an electrically conductive liquid, in this case water W, in an amount to fill a portion of the second channel 32 and in a form of an elongated water tube WT.

A plunger 205 is loaded or placed in the second channel 32 on a side nearer to the first channel 31 than the water W. The plunger 205 is a rhabdom (rectangular parallelepiped) having a rectangular cross section and, in this embodiment, formed of plastic. The plunger 205 has a length greater than the width (diameter) of the first channel 31. The plunger 205 can move smoothly in the second channel 32, and has an outer diameter slightly smaller than the inner diameter of the second channel 32 so that the water W cannot infiltrate or enter into a space between the plunger 205 and the wall surface of the second channel 32. One end face 205a of the plunger 205 is flat, and the other end face 205b has a recess 205c formed therein. The plunger 205 is loaded in the second channel 32 such that the end face 205b, having the recess 205c formed therein, faces the first channel 31. The end face 205a of the plunger 205 is in contact with an end face of the water tube WT trapped in the second channel 32 by the surface tension of the water W. A hydrophilic treatment may be performed for the end face 205a of the plunger 205. A protrusion 11i which is engaged with the recess 205c of the plunger 205 is formed on a wall surface, of the first channel 31, which faces the second channel 32.

The operation of the opening-closing mechanism 201 will be explained with reference to FIGS. 26 and 27. When a predetermined voltage is applied to the electrodes 235c to 235f and the electrodes 235a and 235b are kept at ground potential, the wettability, with respect to the water W, of an area of the insulating film 36 covering the electrodes 235c to 235f becomes higher (the liquid repellency becomes lower) than the wettability, with respect to the water W, of another area of the insulating film 36 covering the electrodes 235a and 235b. Consequently, the water W stays on the area of the insulating film 36 covering the electrodes 235c to 235f. In this state, the plunger 205 is pulled into the second channel 36 because the end face 205a of the plunger 205 is in contact with the water tube WT. As a result, the first channel 31 is open, namely the inside of the ink cartridge is communicated with an outside atmosphere (predetermined space) through the first channel 31.

Figure 27:
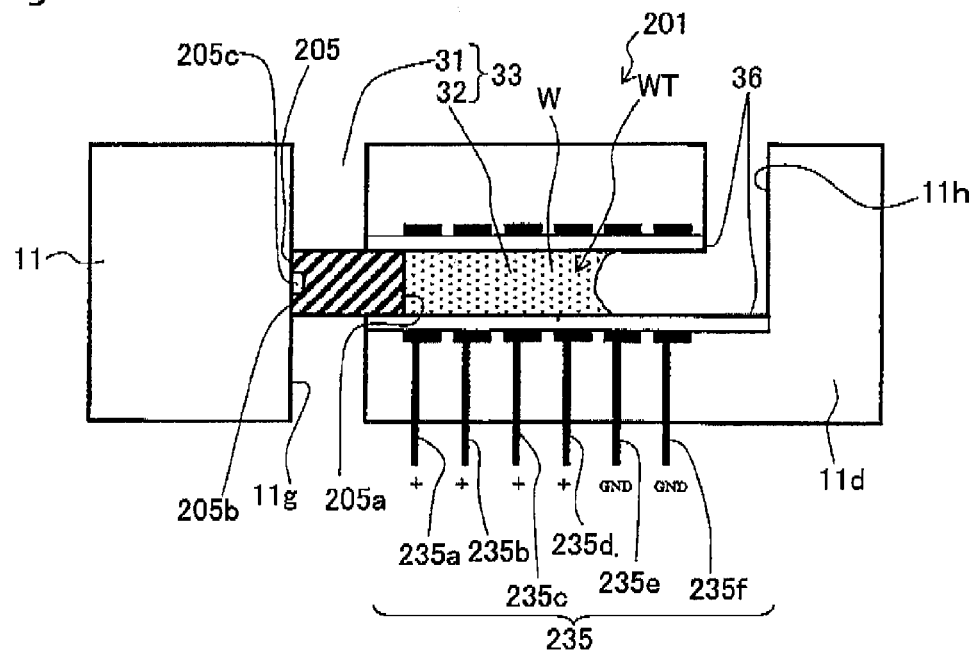
FIG. 27 is a drawing conceptually showing a closed state of the channel opening-closing mechanism according to the fourth embodiment.

Next, as shown in FIG. 27, when the predetermined voltage is applied to the electrodes 235a to 235d, and the voltage application to the electrodes 235*e* and 235*f* is stopped so that the potential of the electrodes 235*e* and 235*f* is changed to the ground potential, the wettability, with respect to the water W, of an area of the insulating film 36 covering the electrodes 235*a* to 235*d* becomes higher (the liquid repellency becomes lower) than the wettability with respect to the water W of another area of the insulating film 36 covering the electrodes 235*e* and 235*f*. Consequently, due to the capillary electrowetting phenomenon, the water tube WT moves instantly in the second passage 32 onto the area of the insulating film 36 covering the electrodes 235*a* to 235*d*. The movement of the water tube WT forces a portion of the plunger 205 to be pushed out of the second channel 32 toward the first channel 31, bringing the end face 205*b* of the plunger 205 into contact with a wall surface of the first channel 31, so as to bring the recess 205*c* of the plunger 205 into engagement with the protrusion 11*i*. As a result, the plunger 205 closes the first channel 31 completely, thereby cutting off the communication between the inner space in the ink cartridge and the outer atmosphere.

When it is desired to open the first channel 31 again, the predetermined voltage is applied to the electrodes 235*c* to 235*f* and the electrodes 235*a* and 235*b* is made to have ground potential so as to return the plunger 205 to the state shown in FIG. 26. Thus, by selectively switching the potentials of the electrodes 235*a* to 235*f*, it is possible to move the position of the water tube WT in the second channel 32, thereby freely controlling the movement of the plunger 205 so as to open or close the first channel 31. By suitably selecting the electrode(s) to which the voltage is to be applied (for example, by making only the electrode 235*a* have ground potential and applying the voltage to the remaining electrodes 235*b* to 235*f*), it is possible to adjust an moving amount of the plunger 205 (the degree to which the first channel 31 is opened and closed), thereby controlling an amount of the gas flowing through the first channel 31. In this manner, the opening-closing mechanism 201 can function also as a flow regulating valve. It should be noted that in the opening-closing mechanism 201, the second channel 32, electrodes 235, insulating film 36, plunger 205, and water W construct a novel actuator.

Attention should be paid particularly to the following points about the opening-closing mechanism 201 according to this embodiment. First, the movement control of the plunger 205 by the water tube WT makes it possible to open or close a channel instantly with a small electric power. Further, when the channel is closed by the plunger 205, the closing strength or reliability depends on the strength of the plunger 205, not on the surface tension of the water W as a liquid. This enables the opening-closing mechanism 201 to function as a very strong locking mechanism. Accordingly, although the fluid which flows through the channel in this embodiment is gas, the opening-closing mechanism can be used for another purpose, such as to reliably stop a high-pressure gas, liquid, solid from flowing, and the like.

First Modification of the Fourth Embodiment

Figure 28:
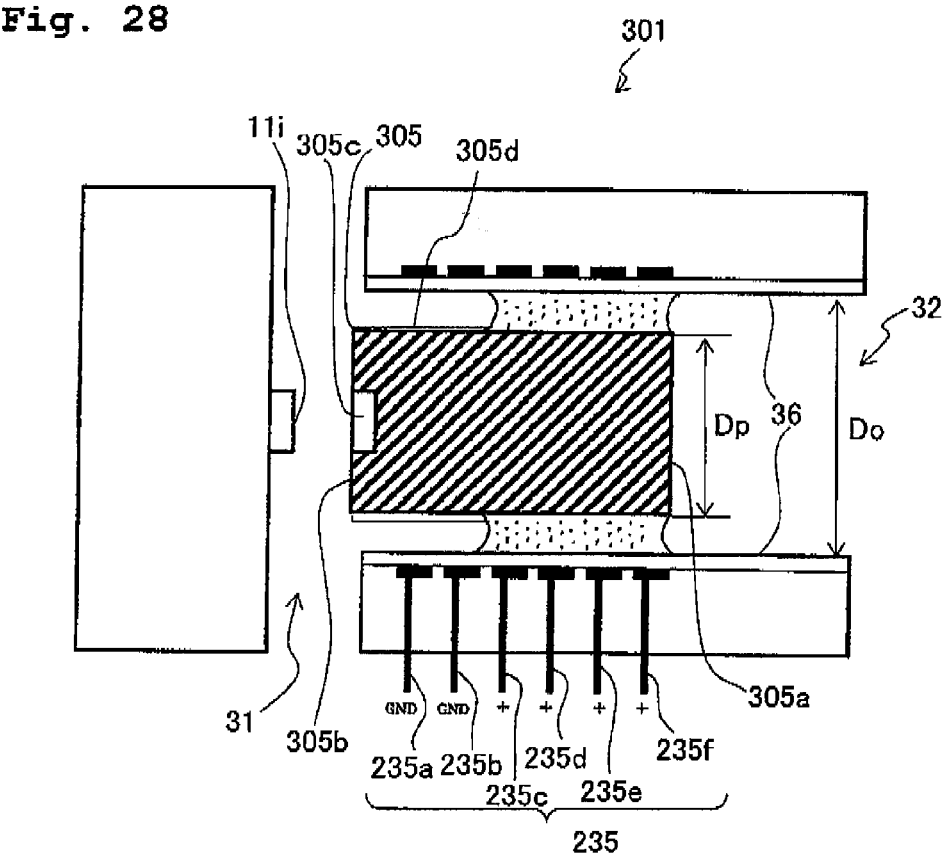
FIG. 28 is a drawing conceptually showing an open state of a channel opening-closing mechanism of a modification 1 of the fourth embodiment.

In the fourth embodiment, since the end face (bottom surface) 205*a* of the plunger 205 is in contact with the water tube WT, the movement of the plunger 205 is controlled by the tube WT pushing or pulling the end face 205*a*. In the first modification of the fourth embodiment, as shown in FIG. 28, a opening-closing mechanism 301 has a plunger 305 in which an outer diameter Dp is smaller than an inner diameter Do of a second channel 32 to an extent that water W can enter a space or gap between the plunger 305 and the second channel 32. Specifically, the diameter of the plunger 305 (width of the plunger 305 in a direction orthogonal to a longitudinal direction of the plunger 305) is made to be smaller by about 100 μm to 8 mm than the diameter of the second channel 32. This makes it possible to keep the plunger 305 in the water tube WT of the water W, and in particular, the surface tension of the water W enables the water tube WT to support the side surfaces of the plunger 305. As shown in FIG. 28, a liquid-repellent film 305*d* is formed on areas, of side walls of the plunger 305, which are near to an end face 305*b* of the plunger 305 in which a recess 305*c* is formed. As a result, only another areas of the plunger 305, which is near to an end face 305*a* of the plunger, is in contact with the water. Other than these, the opening-closing mechanism 301 is similar in structure to the opening-closing mechanism 201 according to the fourth embodiment.

The operation of the opening-closing mechanism 301 is similar to the operation of the opening-closing mechanism according to the fourth embodiment and will be explained briefly below. As shown in FIG. 28, when a predetermined voltage is applied to the electrodes 235*c* to 235*f* and the electrodes 235*a* and 235*b* are kept at ground potential, the wettability with respect to the water W of an area of the insulating film 36 covering the electrodes 235*c* to 235*f* becomes higher (the liquid repellency becomes lower) than the wettability with respect to the water W of another area of the insulating film 36 covering the electrodes 235*a* and 235*b*. This results in the water W staying on the area of the insulating film 36 covering the electrodes 235*c* to 235*f*. In this state, the plunger 305 is pulled into the second channel 36 because a portion, of the side wall of the plunger 305, which is low in liquid repellency (portion at which the liquid-repellent film 305*d* is not formed) is supported in the water tube WT. Consequently, the first channel 31 is open.

Figure 29:
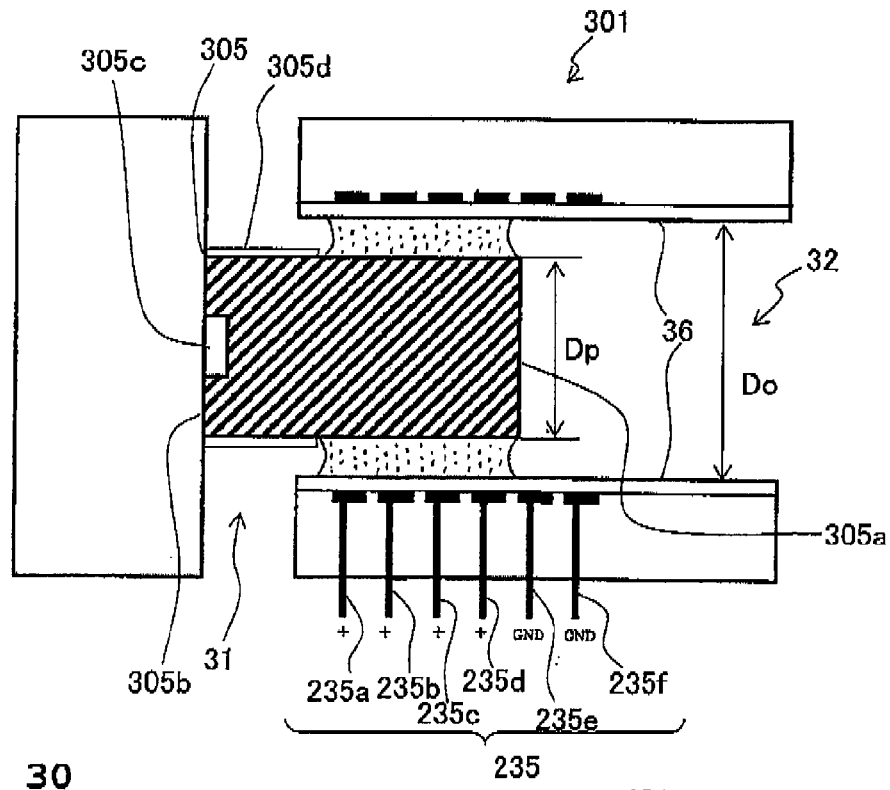
FIG. 29 is a drawing conceptually showing a closed state of the channel opening-closing mechanism of the modification 1 of the fourth embodiment.

In order to close the first channel 31, as shown in FIG. 29, the predetermined voltage is applied to the electrodes 235*a* to 235*d* and the voltage application to the electrodes 235*e* and 235*f* is stopped so that the electrodes 235*e* and 235*f* have ground potential. As a result, the wettability with respect to the water W of an area of the insulating film 36 which covers the electrodes 235*a* to 235*d* becomes higher (the liquid repellency becomes lower) than the wettability with respect to the water W of another area of the insulating film 36 which covers the electrodes 235*e* and 235*f*. Consequently, due to the capillary electrowetting phenomenon, the water tube WT moves instantly in the second passage 32 onto the area of the insulating film 36 covering the electrodes 235*a* to 235*d*. The movement of the water tube WT forces the plunger 305 to be pushed from the second channel 32 toward the first channel 31, bringing the end face 305*b* of the plunger 305 into contact with the wall surface of the first channel 31, thereby bringing the recess 305*c* of the plunger 305 into engagement with the protrusion 11*i*. As a result, the plunger 305 closes the first channel 31 completely. In particular, since the liquid-repellent film 305*d* blocks the first channel 31, the liquid-repellent film 305*d* is effective in preventing liquid leakage when the first channel 31 is a channel for a liquid. The opening-closing mechanism in this modification also can control a flow rate through the first channel 31 by suitably selecting the electrode(s) to which the voltage is to be applied. It should be understood that in the opening-closing mechanism 301, the second channel 32, the electrodes 235, the insulating film 36, the plunger 305, and water W construct a novel actuator.

Second Modification of the Fourth Embodiment

Another modification of the fourth embodiment will be explained with reference to FIGS. 30 and 31. In a opening-closing mechanism 401 of this modification, a fixed spindle 407 which slidably supports a plunger 405 via water W is firmly provided to the opening-closing mechanism 401. In the spindle 407, a plurality of electrodes 435a to 435f are provided at predetermined intervals along a longitudinal direction of the spindle 407. An insulating film 436 is formed on a surface of the spindle 407 so as to cover all the electrodes 435a to 435f. The plunger 405 is hollow, and the spindle 407 is accommodated in the hollow plunger 405 via the water W. A liquid-repellent film 405d is formed on a portion (area near to the first channel) of an inner wall 405c of the plunger 405. Accordingly, the water W is supported by its surface tension on another area of the inner wall of the plunger 405 at which the liquid-repellent film 405d is not formed. The first passage 31 is defined by a cylinder member 403 which is firmly arranged to the first plate member 11. The cylinder member 403 has a through passage 403a which is formed in the cylinder member 403 and which has an open end communicates with the first passage 31. The periphery of the plunger 405 is supported slidably by the through passage 403a. Namely, the through passage 403 of the cylinder member 403 functions as a passage for the plunger 405, the water W as the liquid is accommodated in the through passage 403, and the electrode 435 is provided therein. A protrusion 11j, which engages with the inner wall 405c of the plunger 405, is formed on the wall surface of the first passage 31 which faces the plunger 405.

Figure 30:
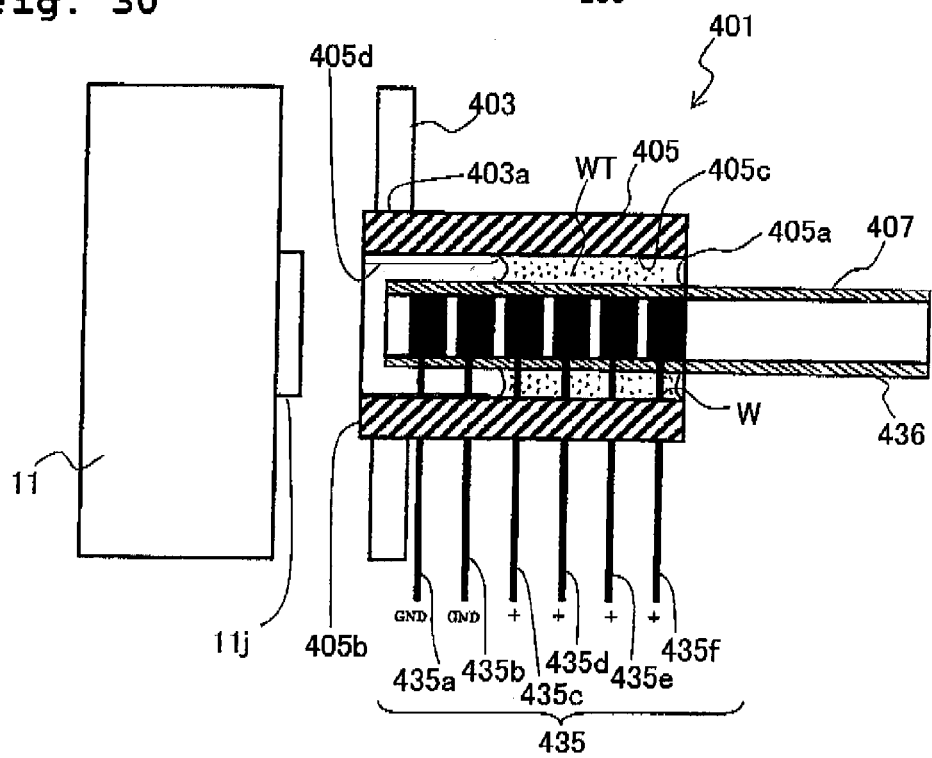
FIG. 30 is a drawing conceptually showing an open state of a channel opening-closing mechanism of a modification 2 of the fourth embodiment.

In the opening-closing mechanism 401, as shown in FIG. 30, when a predetermined voltage is applied to the electrodes 435c to 435f and the electrodes 435a and 435b is kept at ground potential, the wettability with respect to the water W of an area of the insulating film 436 which covers the electrodes 435c to 435f becomes higher (the liquid repellency becomes lower) than the wettability with respect to the water W of another area of the insulating film 436 which covers the electrodes 435a and 435b. This results in the water W staying between the area of the insulating film 36 which covers the electrodes 435c to 435f and the inner wall 405c (the portion on which the liquid-repellent film 405d is not formed) of the plunger 405. In this state, since the portion of the side surface of the plunger 405 which is low in liquid repellency (on which the liquid-repellent film 405d is not formed) is supported, via the water tube WT, by the area of the insulating film 36 which covers the electrodes 435c to 435f, the plunger 405 is positioned away from the protrusion 11j.

Figure 31:
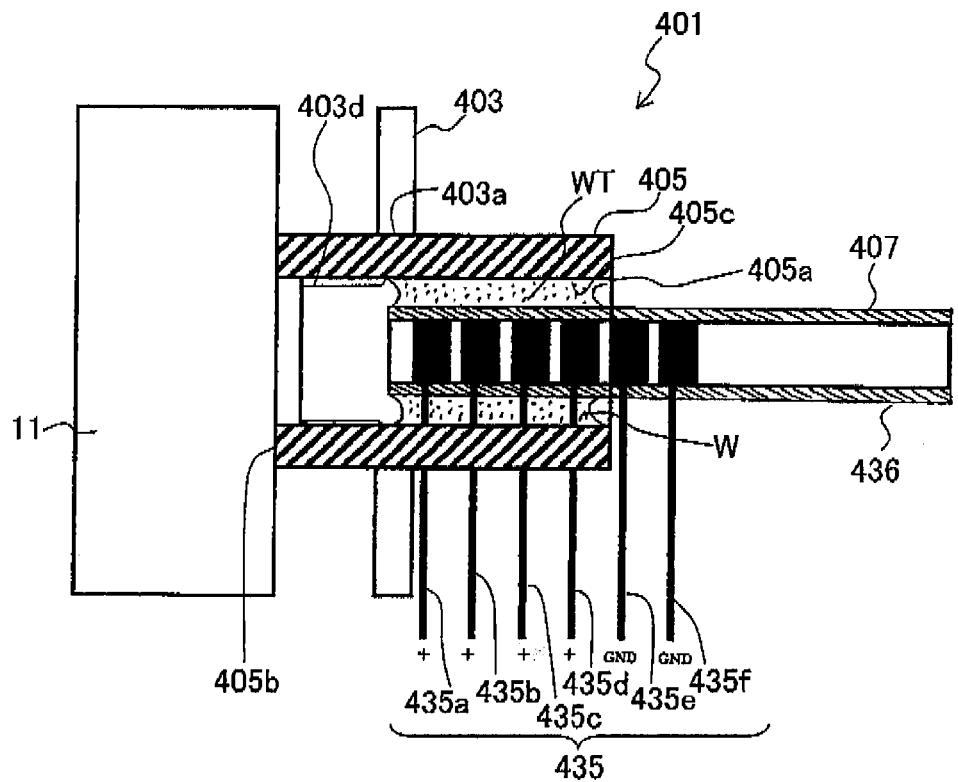
FIG. 31 is a drawing conceptually showing a closed state of the channel opening-closing mechanism of a modification 2 of the fourth embodiment.

In order to close the first channel 31, as shown in FIG. 31, the predetermined voltage is applied to the electrodes 435a to 435d of the spindle 407 and the voltage application to the electrodes 435e and 435f of the spindle is stopped so that the electrodes 435e and 435f have ground potential. As a result, the wettability with respect to the water W of an area of the insulating film 436 which cover the electrodes 435a to 435d becomes higher (the liquid repellency becomes lower) than the wettability with respect to the water W of another area of the insulating film 436 which cover the electrodes 435e and 435f. Consequently, due to the capillary electrowetting phenomenon, the water tube WT moves instantly in the plunger 405 onto the area of the insulating film 436 covering the electrodes 435a to 435d. The movement of the water tube WT forces the plunger 405 to be pushed relative to the spindle 407 toward the first channel 31, while the plunger 405 is supported in the water tube WT, bringing the end 405b of the plunger 405 into contact with the wall surface of the first channel 31, thereby bringing the inner wall 405c of the plunger 405 into engagement with the protrusion 11j. As a result, the plunger 405 closes the first channel 31 completely. It should be understood that in the opening-closing mechanism 401, the cylinder member 403 (passage), the electrode 435, the insulating film 436, the plunger 405, the spindle 407, and water W construct a novel actuator.

As a further improvement on the second modification of the fourth embodiment, the inside of the spindle 407 can be formed to be hollow, and a plurality of holes may be formed through the spindle 407. When the inside of the spindle 407 is filled with water W (electrically conductive liquid), the water W oozes out through these holes, thereby making is possible to compensate for shortage of water W in the plunger 405 and to keep the overall periphery of the spindle 407 wet with water W.

In the fourth embodiment and each of the modification thereof, the liquid-repellent film is provided on the plunger. Alternatively, an area of the plunger on which the liquid-repellent film is not provided may be subjected to a lyophilic treatment (treatment for imparting high wettability). As the lyophilic treatment, a physical surface treatment such as wettability improvement by adjusting the surface roughness of the plunger may be performed for the plunger. Alternatively, a coating which improves wettability by acting chemically on liquid (water W) may be performed for the surface of the plunger.

In the fourth embodiment and each of the modifications thereof, although the plunger is made of a plastic material, the plunger may be made of any synthetic resin material such as urethane foam, a metal material, a rubber-based material, a glass material, or ceramic. The plunger used in the first modification is held floating in the liquid (water W). Therefore, it is preferable that the plunger is molded out of a material which is substantially equal in specific gravity to the liquid used in the first modification. Alternatively, when the plunger has a closed hollow chamber formed inside the plunger, the plunger may be formed of a material which is relatively heavy in specific gravity. For example, the plunger may be formed of a metallic material and made to be hollow.

When the plunger is in contact with the second passage 32, it is desired that a treatment with Teflon (Trade Name), a coating with silicon, a provision of a glass material, or the like is performed on a surface of the plunger, or it is desired that the plunger is formed of the substances as mentioned above. This prevents the friction between the plunger and the second passage 32, any wear due to the friction, and any leakage due to the wear. Alternatively, the outer surface of the plunger may be coated with lubricating oil or the like.

In the fourth embodiment and each of the modifications thereof, the engagement between the recess of the plunger and the protrusion on the wall surface of the first passage closes the first passage reliably. Alternatively, the wall surface may have a recess formed therein, and the plunger may have a protrusion formed therein (for example, a tip of the plunger may be tapered). To further improve the closing and blocking (air-tightness or liquid-tightness) of the first channel, each of the plunger and the wall surface of the first channel may have a recess and a protrusion which are engaged or fitted with each other. The recesses and protrusions may be sealed with Teflon (Trade Name) or the like to further improve the sealing.

In the fourth embodiment and each of the modifications thereof, a specific number of electrodes are provided. However, the number of the electrodes may be changed arbitrarily, and the opening-closing mechanism can operate even with a single electrode. The end face of the second passage 32 on a side opposite to the first passage 31 needs not to be open, and may be closed to form a closed space. The shapes in longitudinal direction and the cross section of the passages may be arbitrary. In particular, the passages and the plunger may be circular in cross-sectional shape in consideration of the resistance to the plunger movement. In the foregoing embodiment and each of the modifications thereof, the electrodes are provided on the passage(s) or the spindle. Alternatively, it is possible to provide the electrodes on a side of the plunger by suitably wiring the electrodes.

Although the first to fourth embodiments are explained by examples in each of which the valve of the present invention is applied to an ink-jet printer, the valve can be applied also to an apparatus which transports an electroconductive liquid other than ink, for example, an apparatus which transports a liquid such as a liquid medicine, a biochemical solution and the like in a micro-total analysis system (µTAS), an apparatus which transports a liquid such as a solvent, a chemical solution and the like in a microchemical system, and the like.

As described above, the blocking by a plunger is mechanically strong. Accordingly, the opening-closing mechanisms according to the fourth embodiment and the modifications thereof are also effective for a channel structure in which liquid or solid (powder) flows into the first passage. The gap or gaps between the plunger and the wall or walls of the second channel can be small, so that these opening-closing mechanisms are also effective to block a passage in which high pressure is exerted on the fluid. The plungers in the first modification and the second modification of the fourth embodiment can be large in size, so that each of the opening-closing mechanisms can be applied to a gas valve of town gas piping, an automatic valve and the like. The opening-closing mechanisms can also be used as regulators and valves in the fuel transport pipes in an automobile and the like, and can be used in a medicine supply systems of a medical equipment. The operation of each of the plungers coming into contact with a wall surface of the first passage can be utilized for a switch or as a display motion. Further, with respect to the wall surface of the first passage, a plurality of the plungers may be arranged along the first passage, or the plungers may be arranged in a two dimensional array with respect to the wall surface of the first passage. Regarding the plungers, regardless of their name, any body may be used as the plunger provided that a body is moved with the liquid due to the capillary electrowetting phenomenon.

INDUSTRIAL APPLICABILITY

In each of the embodiments and the modification thereof, the present invention has been explained as a structure for opening/closing (switching) fluid flow. However, the valve and actuator according to the present invention are not limited to such a structure, and can be used in a switch which selectively cuts off sound wave, electromagnetic wave, light, magnetic field or the like, or can be used in locking mechanisms. In other words, the valve and the actuator can be used, for arbitrary purposes, as a mechanism for selectively stopping or orienting the movement (or flow) of a moving body (or wave). In particular, the nature of the capillary electrowetting phenomenon makes the valve and the actuator expected for use on the water or in water, or in space where there is no influence of gravity.

The invention claimed is:

1. A valve, comprising:
a first passage configured to communicate an electrically conductive first liquid between two spaces that are separated from each other, which is not filled with the first liquid;
a second passage branching from the first passage at a branching position, the second passage being configured to create a first wetting angle of the first liquid at a portion of the second passage in the vicinity of the branching position;
a first electrode provided on a surface of the second passage at a position away from the branching position; and
a first insulating film provided on a surface of the first electrode at the position away from the branching position and provided on the second passage at an adjacent region which is adjacent to the first electrode on an opposite side of the first passage, the first insulating film being configured to create a second wetting angle of the first liquid at the position away from the branching position when a predetermined voltage is applied to the first electrode and to create a third wetting angle of the first liquid at the position away from the branching position when the predetermined voltage is not applied to the first electrode,
wherein the first wetting angle and the second wetting angle are less than the third wetting angle such that the first liquid is held at the branching position and blocks the first passage when the predetermined voltage is not applied to the first electrode.

2. The valve according to claim 1, further comprising a voltage applying unit which applies the predetermined voltage to the first electrode.

3. The valve according to claim 1, further comprising a third passage which branches from the first passage, a second electrode formed on a wall surface forming the first passage, and a third electrode formed on a wall surface forming the third passage;
wherein the first passage communicates a first space and a fourth space, the third passage communicates the first space and a third space, and the second passage communicates the first space and a second space.

4. The valve according to claim 2, wherein when the voltage applying unit applies the predetermined voltage to the first electrode, the first liquid moves from the first passage to the surface of the first insulating film in the second passage so as to open the first passage; and when application of the predetermined voltage to the first electrode is stopped, the first liquid moves from the surface of the first insulating film in the second passage to the first passage so as to close the first passage.

5. The valve according to claim 2, wherein when the predetermined voltage is applied to the first electrode, the wetting angle of the first liquid with respect to the first insulating film is less than 90°; and when the predetermined voltage is not applied to the first electrode, the wetting angle of the first liquid with respect to the first insulating film is not less than 90°.

6. The valve according to claim 2, further comprising:
a second electrode provided on a wall surface forming the first passage; and
a second insulating film provided on a surface of the second electrode;
wherein the voltage applying unit applies a voltage to the second electrode only when the predetermined voltage is not applied to the first electrode.

7. The valve according to claim 2, further comprising a third electrode provided on a wall surface forming the internal passage such that the third electrode is always kept in contact with the first liquid and is maintained at a constant electric potential.

8. The valve according to claim 2, wherein the first passage is greater in passage area than the second passage.

9. The valve according to claim 2, wherein a portion, of a surface of the first liquid, which has no contact with a wall surface of the internal passage is covered with a second liquid which is non-volatile.

10. The valve according to claim 2, further comprising a liquid supply source which is connected to the internal passage to supply the first liquid to the internal passage.

11. An ink cartridge comprising a valve according to claim 2, further comprising:
an ink storage space formed therein and an atmosphere-communicating passage communicating the ink storage space and atmosphere,
wherein the valve is configured to open and close the atmosphere-communicating passage.

12. An ink jet head comprising a cap, the cap comprising a valve according to claim 2, wherein:
the cap is attached to an ink discharge surface of the ink jet head for discharging ink onto a recording medium, and comprising a communicating passage communicating a space on a side of the ink discharge surface and an outside of the ink discharge surface;
wherein the valve is configured to open and close the communicating passage.

13. The valve according to claim 3, wherein:
the valve communicates the first space and the second space by applying the predetermined voltage to the third electrode, without applying a voltage to the first electrode; and
the valve communicates the first space and the third space by applying the predetermined voltage to the first electrode, without applying a voltage to the third electrode.

14. The valve according to claim 7, wherein the third electrode is formed on the wall surface forming the second passage at a position in the vicinity of a branching position at which the second passage branches from the first passage.

15. The valve according to claim 11, wherein the voltage applying unit periodically applies the predetermined voltage for a predetermined period of time to the first electrode.

* * * * *